(12) United States Patent
Li et al.

(10) Patent No.: US 11,633,876 B2
(45) Date of Patent: Apr. 25, 2023

(54) SLURRY SCRAPING MECHANISM AND APPLYING AND SCRAPING DEVICE USED IN SG ABRASIVE PRODUCTION PROCESS

(71) Applicants: QINGDAO UNIVERSITY OF TECHNOLOGY, Shandong (CN); QINGDAO SISA ABRASIVES CO., LTD., Shandong (CN)

(72) Inventors: Changhe Li, Qingdao (CN); Baoteng Huang, Qingdao (CN); Han Zhai, Qingdao (CN); Bingheng Lu, Qingdao (CN); Huajun Cao, Qingdao (CN); Zhen Wang, Qingdao (CN); Qidong Wu, Qingdao (CN); Yanbin Zhang, Qingdao (CN); Min Yang, Qingdao (CN); Yali Hou, Qingdao (CN); Mingzheng Liu, Qingdao (CN); Xin Cui, Qingdao (CN)

(73) Assignees: QINGDAO UNIVERSITY OF TECHNOLOGY, Shandong (CN); QINGDAO SISA ABRASIVES CO., LTD., Shandong (CN)

( * ) Notice: Subject to any disclaimer, the term of this patent is extended or adjusted under 35 U.S.C. 154(b) by 72 days.

(21) Appl. No.: 17/279,040

(22) PCT Filed: Feb. 6, 2020

(86) PCT No.: PCT/CN2020/074389
§ 371 (c)(1),
(2) Date: Mar. 23, 2021

(87) PCT Pub. No.: WO2021/036202
PCT Pub. Date: Mar. 4, 2021

(65) Prior Publication Data
US 2021/0402569 A1    Dec. 30, 2021

(30) Foreign Application Priority Data
Aug. 26, 2019   (CN) .......................... 201910791204.4

(51) Int. Cl.
*B28B 13/00*   (2006.01)
*C09K 3/14*    (2006.01)
(Continued)

(52) U.S. Cl.
CPC ............ *B28B 13/00* (2013.01); *B05C 11/023* (2013.01); *B24D 18/0009* (2013.01);
(Continued)

(58) Field of Classification Search
CPC ....... B28B 13/00; B28B 5/025; B28B 13/028; B28B 19/00; B05C 11/023;
(Continued)

(56) References Cited

U.S. PATENT DOCUMENTS 6,135,859 A   10/2000   Tietz

FOREIGN PATENT DOCUMENTS

CN   103189164 A   7/2013
CN   104760438 A   7/2015
(Continued)

OTHER PUBLICATIONS

May 27, 2020 Search Report issued in International Patent Application No. PCT/CN2020/074389.
(Continued)

*Primary Examiner* — S. Behrooz Ghorishi
*Assistant Examiner* — S. B Ghorishi
(74) *Attorney, Agent, or Firm* — True Shepherd LLC; Andrew C. Cheng

(57) ABSTRACT

A slurry scraping mechanism and an applying and scraping device used in an SG abrasive production process includes a scraping master support; a scraper, wherein the scraper is
(Continued)

connected with the scraping master support through a suspension component such that the scraper is suspended, and a damping spring is arranged in the suspension component; and a torsion spring adjusting component, wherein the torsion spring adjusting component includes a plurality of torsion springs supported by a torsion spring support shaft, the torsion spring support shaft is fixed to the scraping master support, the torsion spring support shaft is movable up and down relative to the scraping master support, the torsion springs are clamped in a V-shaped plate, an end side of the V-shaped plate is connected with the scraping master support, and a side surface of the V-shaped plate is connected with the scraper.

5 Claims, 18 Drawing Sheets

(51) Int. Cl.
    *B28B 19/00*     (2006.01)
    *B05C 11/02*     (2006.01)
    *B24D 18/00*     (2006.01)
    *B28B 5/02*     (2006.01)
    *B28B 13/02*     (2006.01)

(52) U.S. Cl.
    CPC ............ *B28B 5/025* (2013.01); *B28B 13/028* (2013.01); *B28B 19/00* (2013.01); *C09K 3/1409* (2013.01); *C09K 3/1454* (2013.01)

(58) Field of Classification Search
    CPC .............. B24D 18/0009; C09K 3/1409; C09K 3/1454; C09K 3/1418; C09K 3/14
    See application file for complete search history.

(56) References Cited

FOREIGN PATENT DOCUMENTS

| | | | |
|---|---|---|---|
| CN | 204656640 U | * | 9/2015 |
| CN | 204656640 U | | 9/2015 |
| CN | 204681792 U | | 10/2015 |
| CN | 209271794 U | * | 8/2019 |
| CN | 209271794 U | | 8/2019 |
| CN | 110591644 A | | 12/2019 |

OTHER PUBLICATIONS

May 27, 2020 Written Opinion of the International Searching Authority issued in International Patent Application No. PCT/CN2020/074389.

* cited by examiner

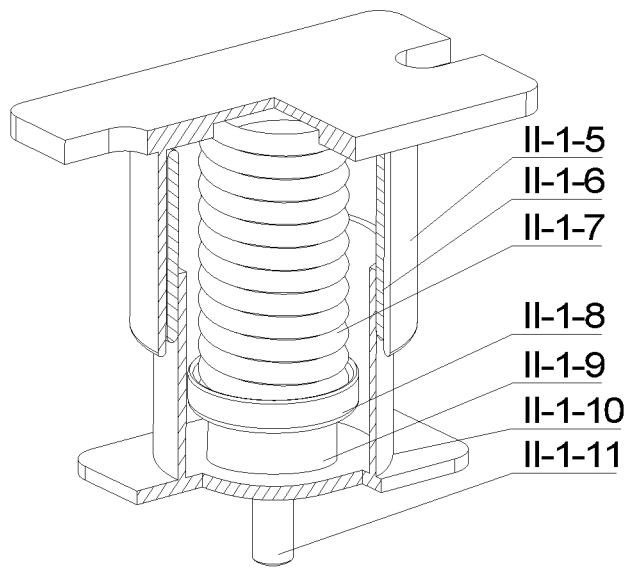
FIG. 27
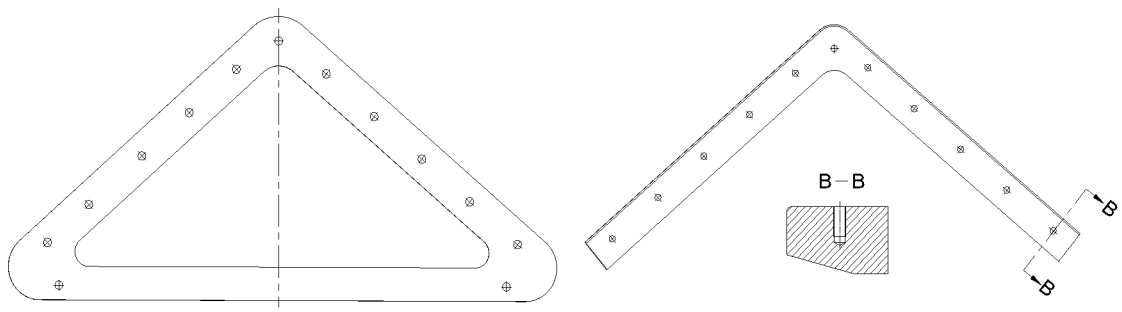
FIG. 28
FIG. 29
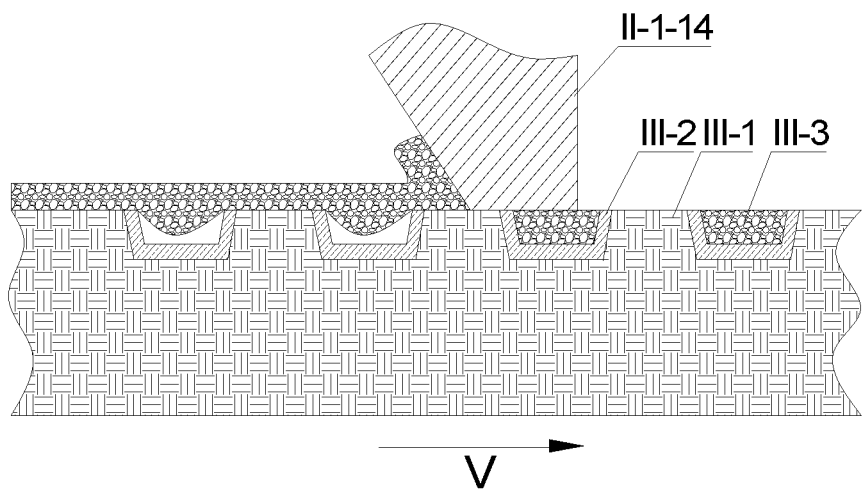
FIG. 30

SLURRY SCRAPING MECHANISM AND APPLYING AND SCRAPING DEVICE USED IN SG ABRASIVE PRODUCTION PROCESS

BACKGROUND

Technical Field

The present invention relates to the field of abrasive production, and in particular, to a slurry scraping mechanism and an applying and scraping device used in an SG abrasive production process.

Related Art

In the year of 1981, the Industrial Abrasives Department of 3M in the United States introduced a ceramic corundum abrasive with the trademark "Cubitron", which has more than twice the toughness of common corundum and has better grinding performance than most common abrasives. In the mid-1980s, Norton developed an SG abrasive, which is also a ceramic corundum abrasive with similar performance to Cubitron. In fact, both of the abrasives are made by a chemical ceramic technique commonly known as the Sol-gel (SG) technique, hence the name SG abrasive is obtained. The technical process is as follows: a hydrosol of $Al_3O_2.H_2O$ is prepared, after gelation, the product is solidified by drying and crushed into grains, and finally, the grains are sintered into the abrasive. Since seeding agents (or seed crystals) are often used in the sol-gel process, the SG technique is also often referred to as the "seeded gel" technique. In the 1980s, the SG technique was used for abrasive production, and SG abrasives began to be used in the field of industrial processing. At present, artificial abrasives on the market are mainly divided into two categories: corundum abrasives and silicon carbide abrasives. However, compared with common corundum abrasives, the new generation of SG abrasives with high hardness, good toughness, good sharpness and the like have the advantages of high abrasive ratio, good shape retention, good surface working quality of workpieces, small dressing of grinding wheels, high grinding efficiency and the like. Therefore, batch production of SG abrasives is very important for increasing the service life of grinding wheels, improving the surface quality of workpieces, and promoting the innovation of grinding wheels. However, the degree of industrial production of SG abrasives in China is low, and its application process urgently needs to be accelerated. The known technology is high in cost, and has the disadvantages of low yield of produced SG abrasives, incomplete shape of abrasives, poor surface morphology, high production cost and the like.

It is found after search that Dennis G. Velligan, Dwight D. Erickson and John T. Borden invented an auxiliary conveying screen printing method for preparing a shaped abrasive and a shaped abrasive prepared by the method (Patent No.: 201510188931.3): firstly, an air-permeable release liner is placed on a plastic grid of a vacuum box, and then the vacuum is turned on. An air flow causes the liner to be adsorbed down to the top of the vacuum box, and then a printing screen is placed on the top of the release liner. A large amount of gel is placed on the top of a patterned screen and scraped into holes using an 8" (20 cm)-wide flexible steel scraper. After the holes of the printing screen are filled, the vacuum increases to about 5.5" Hg (0.73 kPa), which indicates an increase of air flow passing through the air-permeable release liner. Under the condition of keeping the vacuum on, the printing screen is removed from an air-permeable accommodating surface, so that the surface is coated with a screen printing shaped material. The vacuum is turned off, and the accommodating surface still with the wet screen printing shaped material is removed from the top of the vacuum box. The accommodating surface with the screen printing shaped material is dried at 45° C. for 1 hour, and then, the precursor shaped abrasive can be easily scraped from the accommodating surface without damaging the abrasive. Multiple batches of precursor shaped abrasives need to be prepared and collected in this manner, so as to obtain sufficient quantities for firing and subsequent testing.

In this method, the production efficiency of the abrasive is higher, but the feasibility is not high because the coordination between the accommodating surface and the vacuum box is not easy to control, and the accommodating surface may also reduce the surface smoothness of the abrasive. Moreover, in the process of placing the gel onto the top of the patterned screen, the volume of the gel cannot be accurately controlled, which affects the subsequent filling process.

It is found after research that Dennis G. Velligan, Charles J. Studdiner IV, Dwight D. Erickson et al. invented a laser method for preparing a shaped ceramic abrasive, a shaped ceramic abrasive, and an abrasive product (Patent No.: 201180050166.9). If necessary, the pattern can be cut to generate ceramic precursor grains of various shapes, and the grains may remain in a combined state, or may be separated by shapes (for example, by sieving). In some examples, the laser may be aimed at a ceramic precursor material layer so that the cut is substantially perpendicular to its exposed surface. In some examples, the laser may be aimed at the ceramic precursor material layer so that the cut is substantially at an angle relative to its exposed surface, and the scored ceramic precursor material layer is broken along score lines, so as to obtain the shaped ceramic precursor grains.

This method can obtain abrasives of multiple shapes and is high in production efficiency, but the cost is high due to the use of laser cutting. The ceramic precursor material is broken along the score lines to obtain the abrasive, which will cause rough edges and poor completeness of the abrasive.

In conclusion, the existing abrasive production device cannot accurately control a supply amount of the slurry; and the produced abrasive has poor shape completeness, which lowers the performance of the abrasive product. Due to the problem of the belt mold or manufacturing and assembly accuracy, the subsequent rigid scraping mechanism can easily cause damage to the mold or machine. On the other hand, during slurry filling, excess slurry will accumulate in front of the scraping mechanism, hindering the subsequent filling process.

SUMMARY

In order to overcome the disadvantages in the prior art, the present invention provides a slurry scraping mechanism used in an SG abrasive production process, so that cavities can be fully filled with a slurry on a belt mold on the premise of not damaging the belt mold to obtain a complete abrasive structure.

A specific solution of the slurry scraping mechanism used in an SG abrasive production process is as follows:

The slurry scraping mechanism used in an SG abrasive production process includes:

a scraping master support;

a scraper, where the scraper is connected with the scraping master support through a suspension component such that the scraper is suspended, and a damping spring is arranged in the suspension component; and a torsion spring adjusting component, where the torsion spring adjusting component includes a plurality of torsion springs supported by a torsion spring support shaft, the torsion spring support shaft is fixed to the scraping master support, the torsion spring support shaft is movable up and down relative to the scraping master support, the torsion springs are clamped in a V-shaped plate, an end side of the V-shaped plate is connected with the scraping master support, and a side surface of the V-shaped plate is connected with the scraper.

In the above slurry scraping mechanism, the damping spring automatically adjusts the pressure applied to the belt mold, so that the cavities can be fully filled with the slurry on the belt mold on the premise of not damaging the belt mold to obtain a complete abrasive structure. By arranging the torsion spring adjusting component, the transverse force applied by the scraping mechanism is uniform.

Further, the scraper includes a triangular support plate and a scraping plate fixed to a lower part of the triangular support plate, a long side of the triangular support plate is arranged along a length direction of the scraping master support, the scraping plate is a V-shaped scraping plate and is arranged on a lower part of two short sides of the triangular support plate, a bottom side of the scraping plate is a flat surface, and a longitudinal section of the scraping plate is a rectangle with one missing corner. In this way, the shape of a bottom surface of the scraping plate in contact with the slurry is firstly an inclined surface and then a flat surface. The inclined surface can squeeze an applied slurry layer into the cavities of the belt mold, and the flat surface can compact and flatten the slurry in each cavity.

The scraping plate is V-shaped, so that the slurry in front of the scraping mechanism can be led to two sides, thereby preventing the slurry from accumulating and from affecting the filling work. The bottom surface of the scraping plate is a flat surface, the bottom surface of the scraping plate and the belt mold are parallel to each other, the scraping plate and the triangular support plate are connected through a bolt, and a total length of the scraping plate and the triangular support plate may be adjusted through the bolt, thereby controlling an adjustment amount of the damping spring.

Further, the suspension component includes a suspension connecting piece connected with the scraping master support, a height of the suspension connecting piece is adjustable, and the damping spring is arranged below the suspension connecting piece.

Further, the damping spring is arranged in a damping spring seat, a top of the damping spring seat is connected with the suspension connecting piece, and a bottom of the damping spring seat is connected with the scraper.

The suspension connecting piece includes a suspension outer connecting piece and a suspension inner connecting piece capable of being nested in the suspension outer connecting piece, the suspension outer connecting piece is connected with the scraping master support, a bottom side of the suspension inner connecting piece is connected with the top of the damping spring seat, one of the suspension outer connecting piece or the suspension inner connecting piece is provided with an elongated hole, and the other is provided with a plurality of bolt holes. A bolt runs through the elongated hole and the bolt hole to realize the connection between the suspension outer connecting piece and the suspension inner connecting piece, and the different bolt holes realize height adjustment of the suspension connecting piece.

Further, the V-shaped plate includes a torsion spring adjusting plate and a torsion spring baffle hingedly connected with the torsion spring adjusting plate, the torsion spring baffle is arranged below the torsion spring, the torsion spring baffle is connected with the scraper, and the torsion spring adjusting plate is connected with the torsion spring baffle through a hinge.

The scraping master support is provided with longitudinal guide rails, the longitudinal guide rails are vertically arranged on two sides of the scraping master support, the longitudinal guide rail is sleeved with a longitudinal slider, the longitudinal slider is connected with a longitudinal adjusting plate arranged vertically, the longitudinal adjusting plate is connected with an end part of the torsion spring adjusting plate, and two ends of the torsion spring support shaft are connected with the longitudinal adjusting plate. When a total length of the suspension component changes, the torsion spring adjusting component moves up and down under a guide action of the longitudinal guide rails. One end of the torsion spring is in contact with the torsion spring adjusting plate, and the other end is in contact with the torsion spring baffle. Under the action of the torsion springs, the scraping plate is uniformly stressed, so that the cavity is filled with the slurry more uniformly.

The present invention further provides a slurry applying and scraping device used in an SG abrasive production process. The device integrates three functions of slurry application, slurry filling and residual cleaning. A syringe applying mechanism is utilized to realize quantitative and accurate application of the slurry. A slurry filling device is also utilized. A residual cleaning mechanism is added. Extension springs and a cleaning plate are utilized to remove a residual slurry layer on the surface of the mold.

The slurry applying and scraping device used in an SG abrasive production process includes:

a syringe applying mechanism across a belt mold conveyor line, including a syringe for injecting a slurry to a belt mold; and the scraping mechanism, where the scraping mechanism is arranged on one side of the syringe applying mechanism, and the scraping mechanism is also arranged along the belt mold conveyor line.

In the above slurry applying and scraping device, the syringe applying mechanism uniformly and rapidly applies a prepared abrasive slurry to the belt mold, and the scraping mechanism scrapes the applied slurry such that cavities are filled with the slurry, thereby realizing continuous operation.

Further, in order to prevent the residual slurry layer on the surface of the belt mold after the action of the scraping mechanism, a residual cleaning mechanism is specially arranged. The slurry applying and scraping device used in an SG abrasive production process further includes a residual cleaning mechanism, where the scraping mechanism is arranged between the syringe applying mechanism and the residual cleaning mechanism, the residual cleaning mechanism is arranged on one side of the scraping mechanism, the residual cleaning mechanism includes a cleaner support frame across the belt mold conveyor line, and the cleaner support frame supports a cleaner.

Further, the cleaner includes a cleaning plate of which a bottom is capable of contacting the belt mold, the cleaning plate is connected with a cleaning moving component through extension springs, the cleaning moving component is connected with a cleaning lifting component supported by the cleaner support frame, the cleaning moving component drives the cleaning plate to move along a width direction of the belt mold, and the cleaning lifting component drives the cleaning plate to move up and down.

The cleaning moving component includes a cleaner guide rail and a cleaner lead screw nut pair mounted on the cleaner support frame. The cleaner guide rail is arranged horizontally, and the cleaner guide rail is sleeved with a cleaner slider. The cleaner lead screw nut pair includes a lead screw connected with a power source, the lead screw is sleeved with a lead screw nut, and the lead screw nut is connected with the cleaner slider. In this way, the lead screw rotates, the lead screw nut drives the cleaner slider to move relative to the cleaner support frame, the cleaner is movable along a length direction of the belt mold, the cleaning lifting component may be a lead screw nut lifting mechanism or other mechanism capable of realizing lifting, and the cleaning lifting component is connected with the cleaner guide rail. In the forward process, the cleaner moves down to clean the residual, and in the backward process, the cleaner moves up.

In addition, a size of a bottom end of the cleaning plate is smaller than that of a middle end and an upper end of the cleaning plate, the upper end of the cleaning plate is connected with a cleaning connecting plate, two sides of an upper surface of the cleaning connecting plate are respectively provided with the extension spring, and one end of the extension spring is suspended on a hinge bolt below the cleaner slider. By arranging the extension springs, the force acting on the surface of the belt mold by the cleaning plate can be adjusted in time. The cleaning plate works in one direction. In the working process, the cleaning plate is in direct contact with the belt mold such that the residual slurry on the surface of the belt mold can be swept off. Under the action of the extension springs, the cleaner can automatically adjust the sweeping force and clean the residual slurry on the premise of protecting the belt mold.

Further, the syringe applying mechanism includes a syringe support frame, the syringe support frame supports a guide rail, the syringe is mounted on the guide rail, the guide rail is connected with a syringe lifting component, and the guide rail is connected with a syringe horizontal moving component.

Further, the syringe includes a syringe barrel connected with the guide rail, a side part of the syringe barrel is provided with a slurry inlet such that the slurry can be supplied in time according to the amount of the slurry remaining inside the syringe barrel, a bottom side of the syringe barrel is provided with a slurry outlet, a syringe piston is arranged in the syringe barrel, and the syringe piston is connected with a linear pushing component. The linear pushing component is a ball screw nut pair, so that the application process is stable and rapid, and the supply amount of the slurry is accurately controlled.

The syringe lifting component is composed of two sets of lead screw nut pair lifting mechanisms, and lead screws on the left and right sides are respectively connected with an electric motor 2 fixing block and a timing belt positioning block such that rotation of the electric motor is converted into an up-and-down movement of the guide rail. The syringe horizontal moving component is also a lead screw nut pair horizontal moving mechanism, a lead screw of the syringe horizontal moving component is arranged in parallel to the guide rail, a lead screw nut of the syringe horizontal moving component is a syringe support slider, and the syringe barrel is connected with the syringe support slider through a syringe lower frame.

Alternatively, in another solution, the scraping mechanism is replaceable with a first scraping mechanism including a scraping master support and a scraper, the scraper is connected with the scraping master support through a suspension component such that the scraper is suspended, and a damping spring is arranged in the suspension component. The structure of the scraper and the scraping master support is the same as that in the above scraping mechanism.

Compared with the prior art, the present invention has the following beneficial effects:

1) By arranging the slurry scraping mechanism in the present invention, the damping spring can automatically adjust the pressure applied to the belt mold, and the damping spring can perform a function of flexible control in the connection of the scraper to avoid damage to the surface and cavities of the belt mold. More importantly, the flexible adjustment has a good protective effect on the shape completeness of the abrasive, so that the cavities can be fully filled with the slurry on the belt mold on the premise of not damaging the belt mold to obtain a complete abrasive structure.

2) By arranging the torsion spring adjusting component in the present invention, the scraping mechanism applies force uniformly in the transverse direction, which avoids damage to the mold or machine and improves the service life of the device.

3) By arranging the V-shaped scraping plate in the present invention, the slurry in front of the scraping mechanism can be led to two sides, thereby preventing the slurry from accumulating and from affecting the filling work. Moreover, through the arrangement of the bottom surface of the scraping plate, compaction is implemented after filling during work, so that the obtained abrasive grains have good shape completeness, and the product performance is enhanced.

4) By arranging the cleaning mechanism in the present invention, in the work process, the cleaning plate is in direct contact with the belt mold, so that the residual slurry on the surface of the belt mold can be swept off, thereby preventing the residual slurry layer from being solidified and mixed with the abrasive grains, which increases the difficulty of separating the abrasive grains. Under the action of the extension springs, the cleaning plate can automatically adjust the sweeping force and clean the residual slurry on the premise of protecting the belt mold.

5) By arranging the applying and scraping mechanisms in the present invention, the application, scraping and filling, and the cleaner work independently, and all stations are convenient to adjust. The device has reasonable structural design and high feasibility, and is easy for production. The produced abrasive has high shape completeness, which enhances the performance of the abrasive product. Moreover, by arranging the damping spring and the torsion springs, the device has a long service life.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

FIG. 13(*b*) is a side view of the syringe support slider in Example 2 of the present invention.

FIG. 13(*c*) is an inner side schematic diagram of the syringe support slider in Example 2 of the present invention.

FIG. 16(*b*) is a semi-sectional view of section A-A in FIG. 16(*a*) of the syringe lower frame in Example 2 of the present invention.

FIG. 27 is an axonometric view of a damping spring in Example 1 of the present invention.

FIG. 28 is a front view of a triangular support plate in Example 1 of the present invention.

FIG. 29 is a front view and a sectional view of a scraping plate in Example 1 of the present invention.

FIG. 30 is a schematic diagram of a slurry filling process in Example 1 of the present invention.

In the figures:

Figure 1:
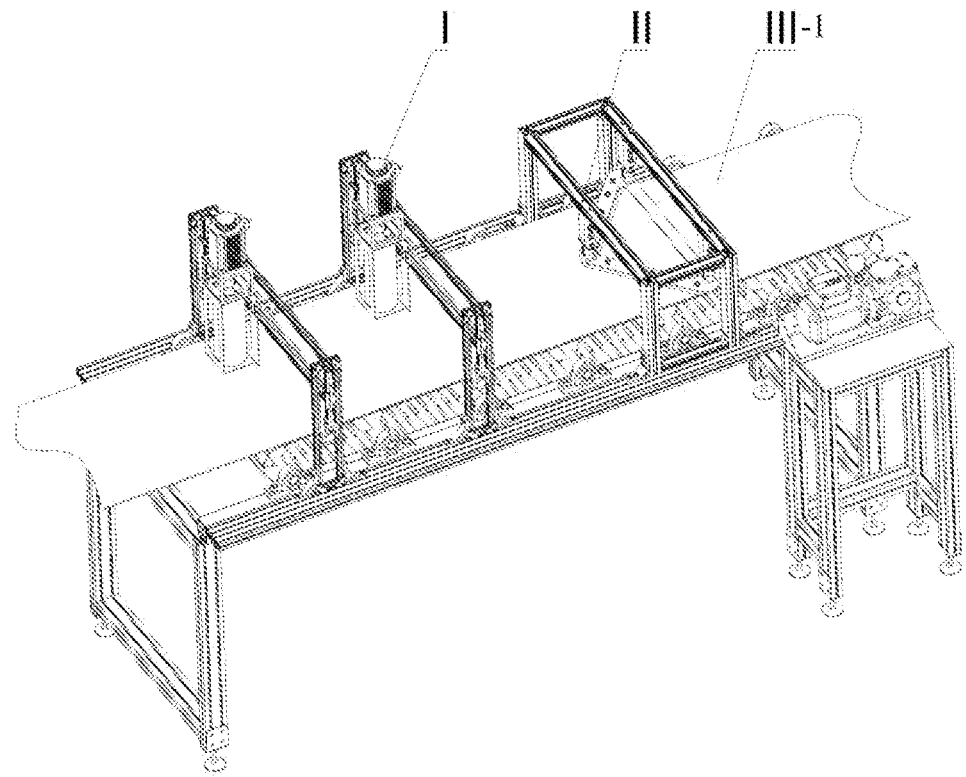
FIG. 1 is a general assembly diagram of a slurry applying and scraping device in Example 2 of the present invention.
Figure 2:
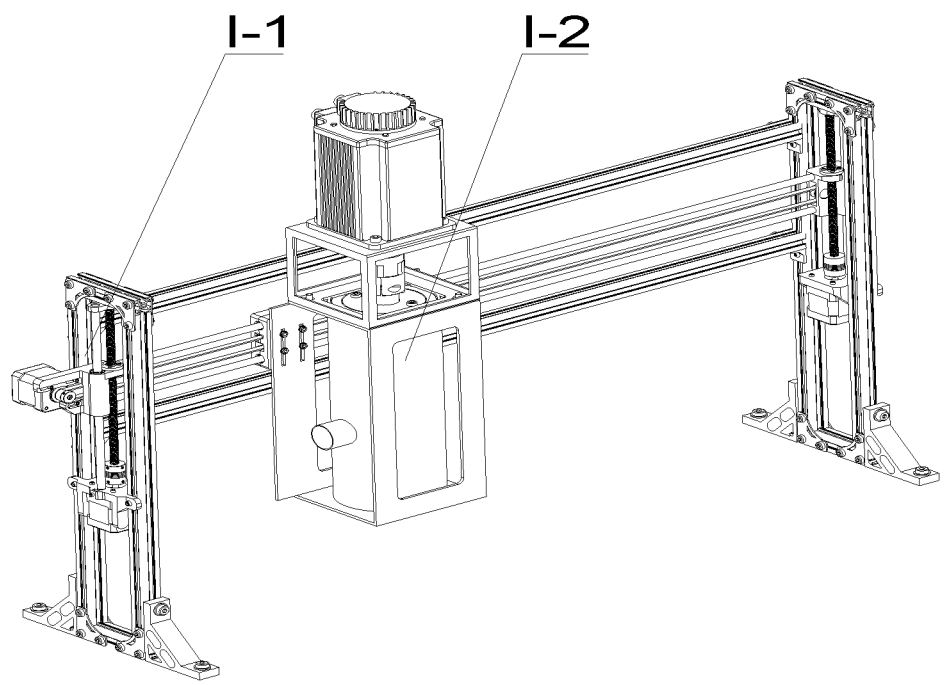
FIG. 2 is an axonometric view of a syringe applying mechanism in Example 2 of the present invention.

I: syringe applying mechanism; II: slurry scraping mechanism;

I-1: syringe support frame; I-2: syringe; I-1-1: syringe left support frame angle plate bolt; I-1-2: syringe left support frame angle plate; I-1-3: guide rail 1; I-1-4: lead screw nut 1; I-1-5: linear bearing 1; I-1-6: linear bearing fixing ring 1; I-1-7: electric motor 2 fixing block; I-1-8: coupling 1; I-1-9: electric motor 1 fixing plate bolt; I-1-10: electric motor 1; I-1-11: support frame profile; I-1-12: support frame angle support bolt; I-1-13: support frame angle support; I-1-14: lead screw support seat 1; I-1-15: timing belt positioning block; I-1-16: timing belt positioning wheel; I-1-17: electric motor 1 positioning plate; I-1-18: axis pin and cotter pin; I-1-19: holding screw 1; I-1-20: lead screw; I-1-21: lead screw nut fixing screw; I-1-22: linear bearing 2; I-1-23: linear bearing fixing ring 2; I-1-24: holding screw 2; I-1-25: timing belt pulley; I-1-26: electric motor 2; I-1-27: guide rail 3; I-1-28: syringe support slider; I-1-29: timing belt; I-1-30: syringe support slider bolt; I-1-31: transverse support profile; I-1-32: linear bearing 3;

I-2-1: electric motor 3; I-2-2: electric motor fixing bolt; I-2-3: syringe upper frame; I-2-4: coupling 2; I-2-5: upper frame bolt; I-2-6: syringe lead screw upper part fixing ring bolt; I-2-7: syringe lead screw upper part fixing ring; I-2-8: thrust bearing; I-2-9: thrust bearing seat; I-2-10: syringe lead screw nut; I-2-11: syringe lead screw nut lower retaining ring; I-2-12: syringe lower frame; I-2-13: syringe barrel plug; I-2-14: syringe barrel; I-2-15: syringe piston; I-2-16: push rod; I-2-17: syringe lead screw nut lower retaining ring; I-2-18: thrust bearing sealing ring; I-2-19: syringe lead screw; I-2-20: rubber ring;

II-1: scraper and suspension component; II-2: scraping mechanism master support; II-1-1: suspension outer connecting piece; II-1-2: suspension outer connecting piece bolt; II-1-3: suspension inner connecting piece bolt; II-1-4: suspension inner connecting piece; II-1-5: damping spring top seat; II-1-6: damping spring rubber sheet; II-1-7: damping spring; II-1-8: spring seat; II-1-9: spring seat support block; II-1-10: damping spring tail seat; II-1-11: damping spring screw; II-1-12: triangular support plate bolt; II-1-13: triangular support plate; II-1-14: scraping plate II-2-1: scraping mechanism support plate; II-2-2: longitudinal guide rail fixing bolt III-1: belt mold; III-2: release agent; III-3: slurry IV-1: scraping mechanism 2 master support; IV-2: second scraper IV-2-1: longitudinal guide rail fixing profile; IV-2-2: longitudinal guide rail fixing bolt; IV-2-3: longitudinal slider; IV-2-4: longitudinal guide rail; IV-2-5: longitudinal adjusting plate; IV-2-6: longitudinal adjusting plate bolt; IV-2-7: torsion spring baffle bolt; IV-2-8: sleeve; IV-2-9: triangular support frame; IV-2-10: torsion spring baffle; IV-2-11: torsion spring; IV-2-12: hinge; IV-2-13: torsion spring adjusting plate; IV-2-14: torsion spring adjusting plate bolt; IV-2-15: torsion spring support shaft; IV-2-16: angle plate V-1: cleaner support frame; V-2: cleaner, V-1-1: lead screw support seat 2; V-1-2: lead screw nut fixing plate; V-1-3: lead screw 2; V-1-4: cleaner lifting component; V-1-5: coupling 2; V-1-6: electric motor 4 fixing plate; V-1-7: electric motor 4; V-1-8: residual cleaning mechanism support profile; V-2-1: cleaner guide rail; V-2-2: cleaner slider; V-2-3: hinge plate; V-2-4: hinge bolt; V-2-5: cleaner lead screw; V-2-6: cleaner transverse lead screw nut fixing plate; V-2-7: cleaning plate connecting plate; V-2-8: extension spring; V-2-9: cleaning plate connecting plate bolt; V-2-10: cleaner transverse lead screw nut; V-2-11: cleaner transverse lead screw nut bolt; V-2-12: cleaning plate; V-2-13: spring hinge pin; V-2-14: cleaner transverse lead screw fixing profile 1; V-2-15: electric motor 6 fixing plate; V-2-16: electric motor 6; V-2-17: cleaner connecting profile; V-2-18: cleaner transverse lead screw support seat; V-2-19: cleaner transverse lead screw fixing profile 2.

DETAILED DESCRIPTION

It should be pointed out that the following detailed descriptions are all illustrative and are intended to provide further descriptions of the present invention. Unless otherwise specified, all technical and scientific terms used herein have the same meanings as those usually understood by a person of ordinary skill in the art to which the present disclosure belongs.

It should be noted that the terms used herein are merely used for describing specific implementations, and are not intended to limit exemplary implementations of the present disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

As described in the background art, there are disadvantages in the prior art. In order to solve the above technical problems, the present invention provides a slurry scraping mechanism used in an SG abrasive production process. The present invention will be further explained below in conjunction with the accompanying drawings of the specification.

Example 1

Figure 22:
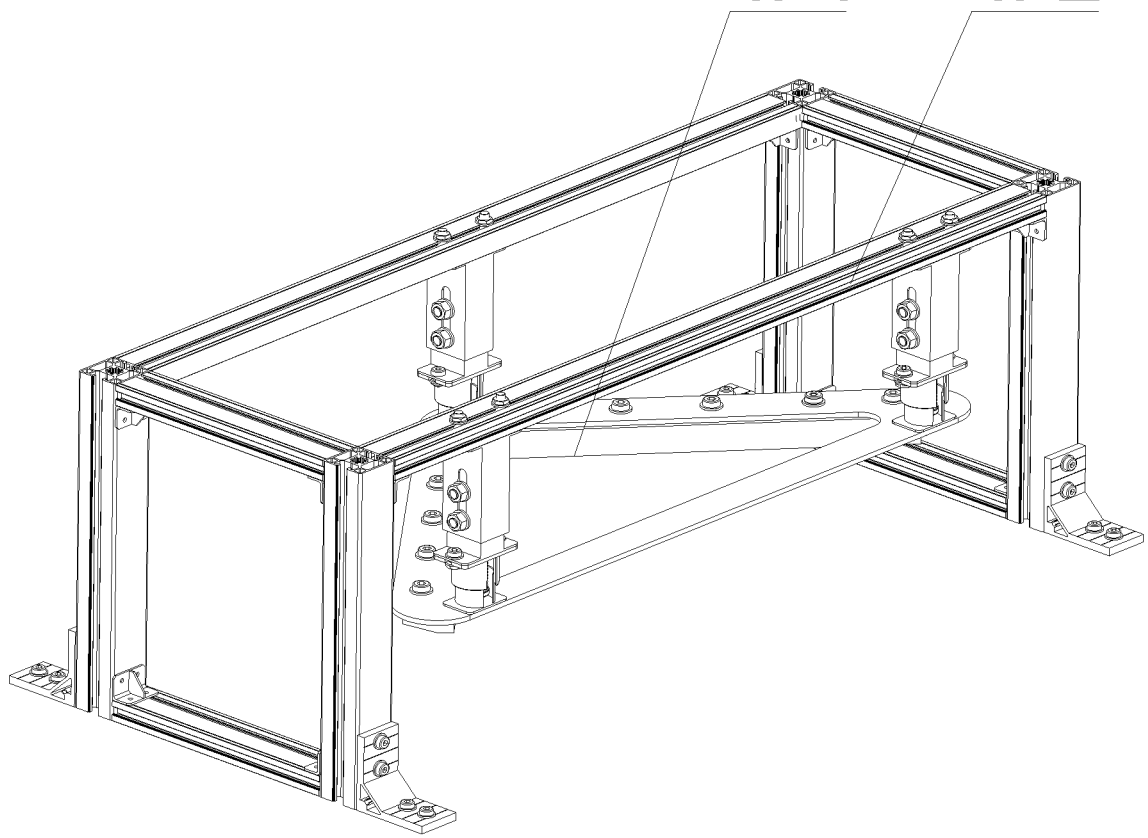
FIG. 22 is an axonometric view of a first scraping mechanism in Example 1 of the present invention.

In a typical embodiment of the present invention, a slurry scraping mechanism used in an SG abrasive production process is provided, as shown in an axonometric view of a scraping mechanism in FIG. 22, the scraping mechanism includes a scraper and suspension component II-1 and a scraping mechanism master support II-2. The scraping mechanism is a first scraping mechanism.

Figure 23:
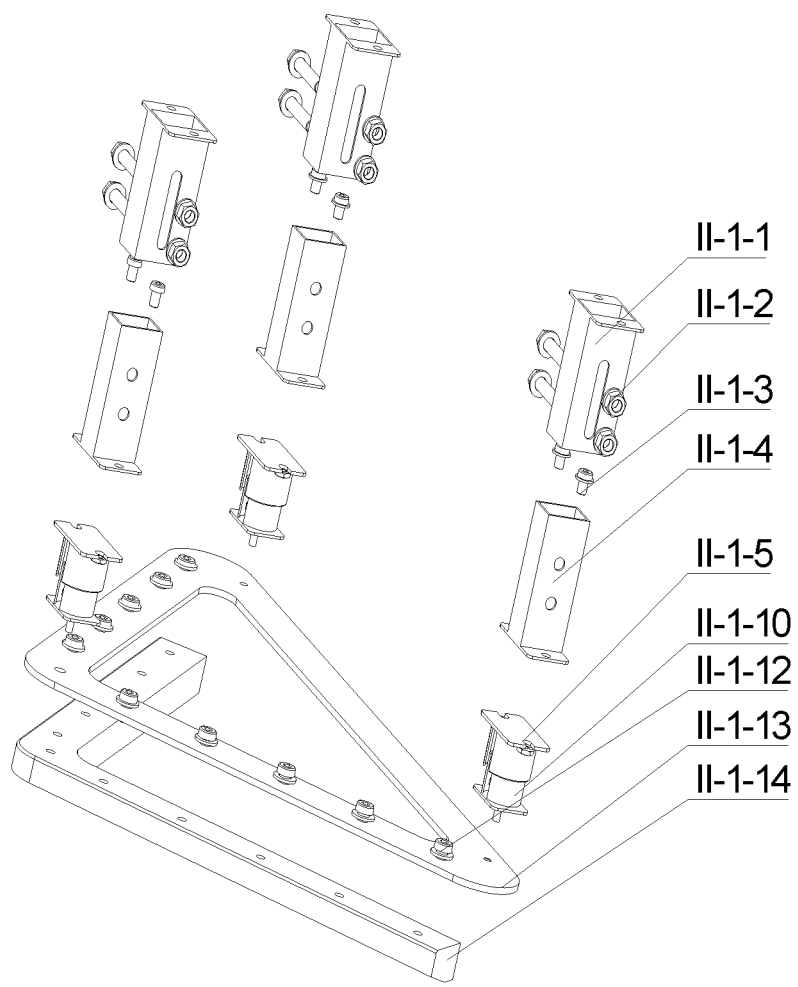
FIG. 23 is an exploded view of a scraper and suspension component in Example 1 of the present invention.
Figure 24:
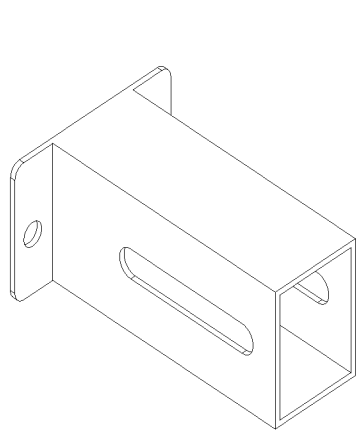
FIG. 24 is an axonometric view of a suspension outer connecting piece in Example 1 of the present invention.
Figure 25:
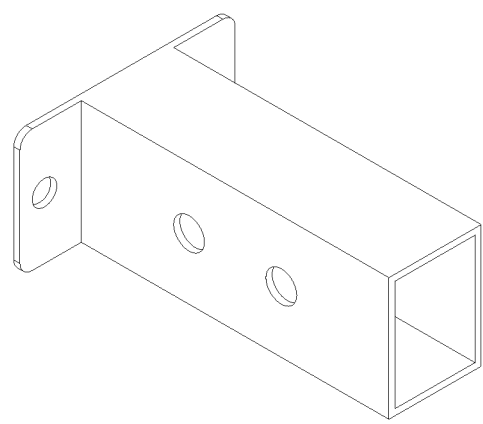
FIG. 25 is an axonometric view of a suspension inner connecting piece in Example 1 of the present invention.
Figure 26:
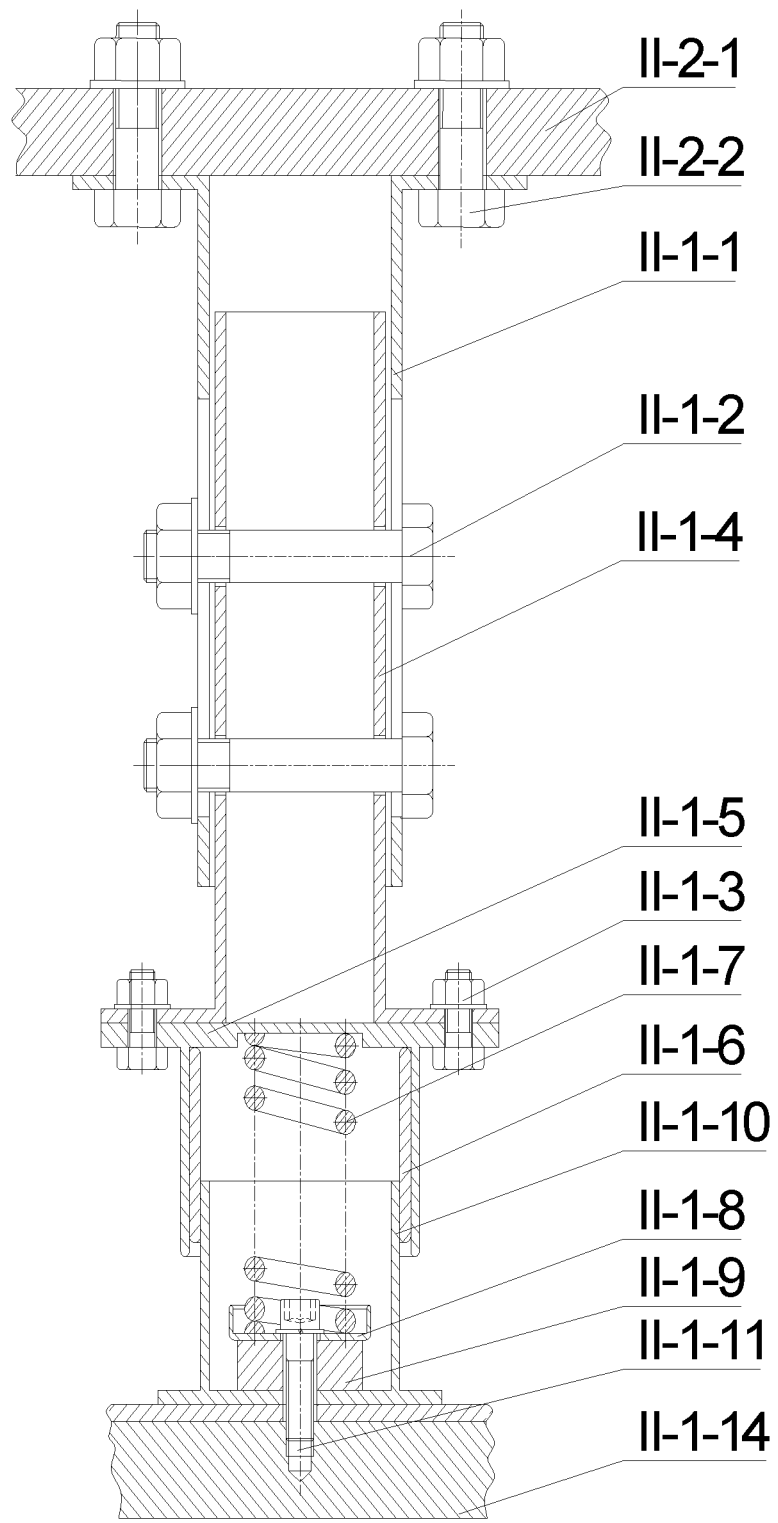
FIG. 26 is a full sectional view of the first scraping mechanism and the suspension component in Example 1 of the present invention.

As shown in an exploded view of a scraper and suspension component in FIG. 23, an axonometric view of a suspension outer connecting piece in FIG. 24, an axonometric view of a suspension inner connecting piece in FIG. 25, a full sectional view of a scraping mechanism and a suspension component in FIG. 26, an axonometric view of a damping spring in FIG. 27, a front view of a triangular support plate in FIG. 28 and a front view and a sectional view of a scraping plate in FIG. 29, a suspension outer connecting piece II-1-1 is fixed to a scraping mechanism support plate II-2-1 composed of longitudinal guide rail fixing profiles through a longitudinal guide rail fixing bolt II-2-2, the scraping mechanism support plate II-2-1 is in the shape of an inverted U, and a suspension inner connecting piece is connected with a suspension outer connecting piece II-1-1 through a suspension outer connecting piece bolt II-1-2. The tightness of the suspension outer connecting piece bolt is adjusted to adjust the relative location of the two connecting pieces, that is, a total length of the two connecting pieces. A damping spring seat includes a damping spring top seat and a damping spring bottom seat, a lower end of the suspension inner connecting piece is connected with the damping spring top seat II-1-5 through a suspension inner connecting piece bolt II-1-3, an inner side of the damping spring top seat II-1-5 is provided with a damping spring rubber sheet II-1-6, an inner side of the damping spring rubber sheet II-1-6 is provided with a damping spring tail seat II-1-10, an upper end of the damping spring II-1-7 is fixed to the damping spring top seat II-1-5, a lower end of the damping spring II-1-7 is fixed to a spring seat II-1-8, and a spring seat support block II-1-9 is installed on a lower end of the spring seat II-1-8. When the scraping plate fills the belt mold cavities with the slurry layer, the damping spring can automatically adjust the longitudinal force applied to the scraping plate. A damping spring screw II-1-11 connects the spring seat II-1-8, the spring seat support block II-1-9, the damping spring tail seat II-1-10, the triangular support plate II-1-13 and the scraping plate II-1-14.

As shown in FIG. 30, a belt mold III-1 moves rightward at a stepping rate V, the belt mold cavities have been sprayed with a release agent III-2, there is a slurry layer that has finished application in front of the scraping plate II-1-14, the inclined surface of the scraping plate squeezes the slurry into the mold cavities, and the bottom surface of the scraping plate flattens and compacts the slurry III-3.

Figure 31:
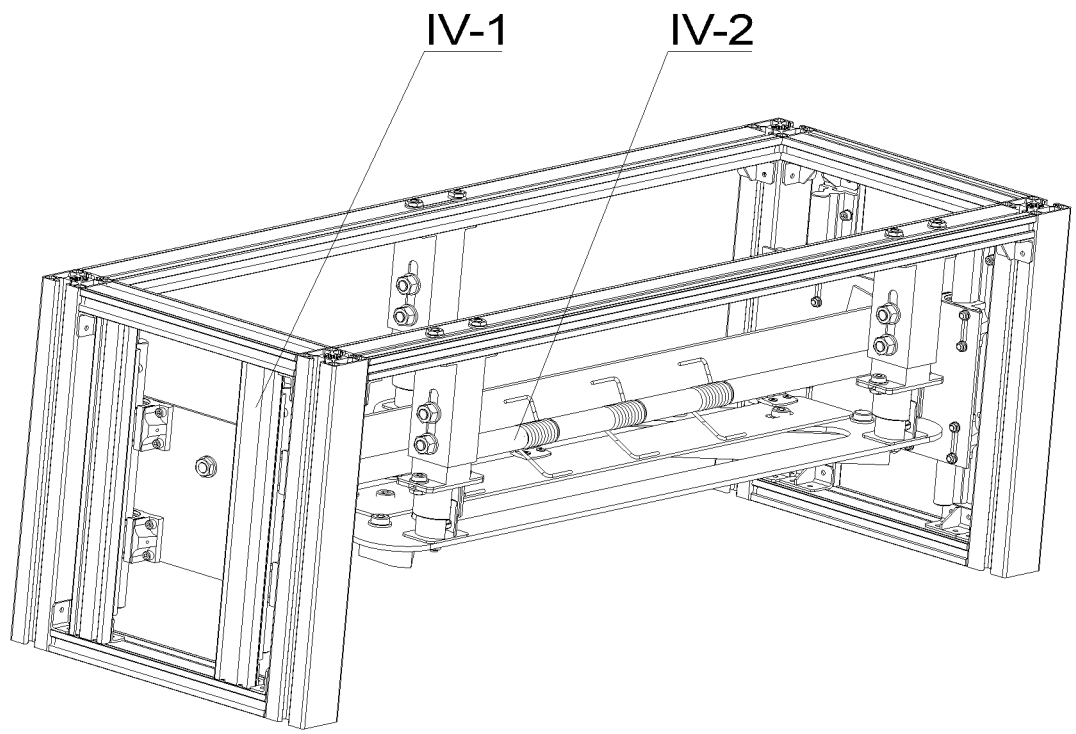
FIG. 31 is a general assembly diagram of a second scraping mechanism in Example 1 of the present invention.

As shown in the general assembly diagram of the second scraping mechanism in FIG. 31, the second scraping mechanism includes a second scraping mechanism master support IV-1, a second scraper IV-2, a second suspension component and a torsion spring adjusting component. The structures of the second scraping mechanism master support, the second scraper and the second suspension component are the same as those in the first scraping mechanism.

Figure 32:
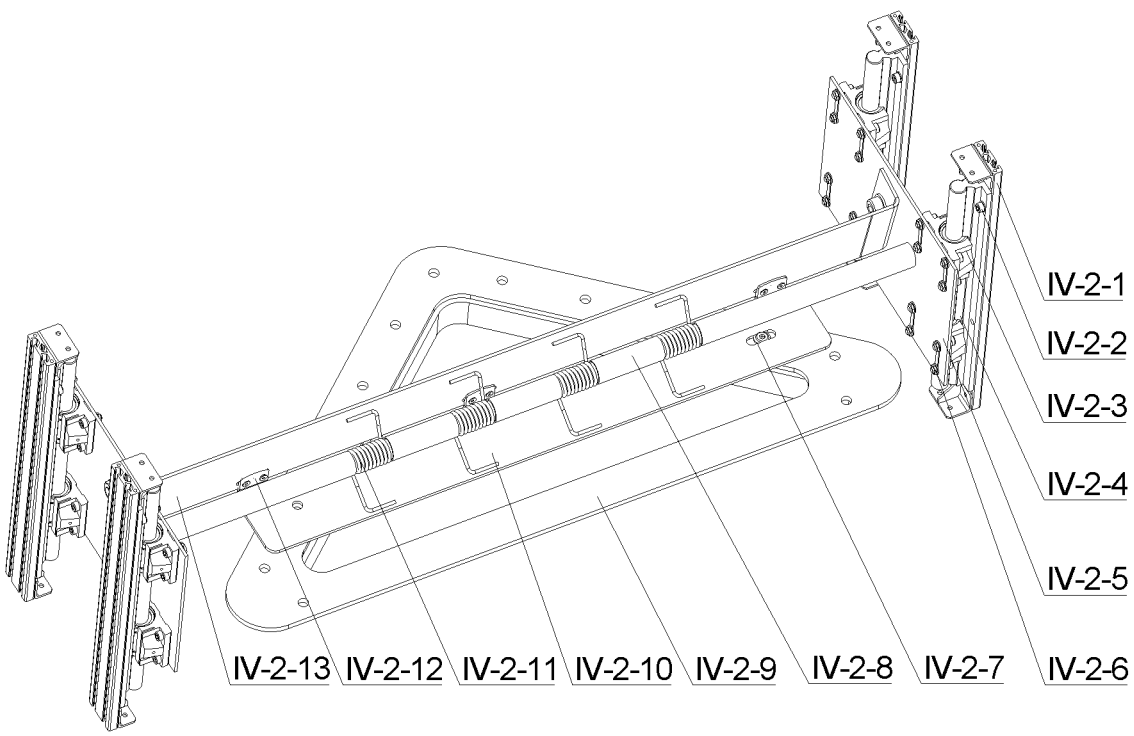
FIG. 32 is an axonometric view of a second scraper and a lead screw-guide rail group in Example 1 of the present invention.
Figure 33:
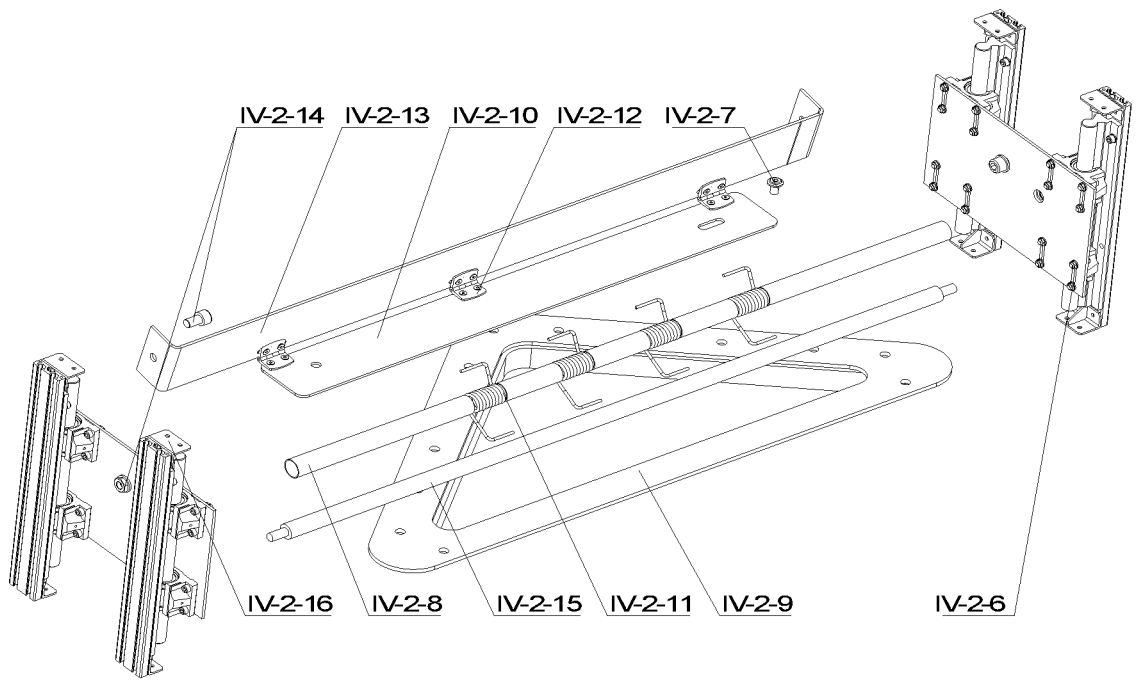
FIG. 33 is an exploded view of the second scraper and the lead screw-guide rail group in Example 1 of the present invention.

As shown in an axonometric view of a second scraper and a lead screw-guide rail group in FIG. 32 and an exploded view of the second scraper and the lead screw-guide rail group in FIG. 33, a longitudinal guide rail IV-2-4 is fixed to a longitudinal guide rail fixing profile IV-2-1 through a longitudinal guide rail fixing bolt IV-2-2, the longitudinal guide rail fixing profile IV-2-1 is fixed to a machine frame through an angle plate IV-2-16, and a longitudinal adjusting plate IV-2-5 is fixed to the longitudinal guide rail IV-2-4 through a longitudinal adjusting plate bolt IV-2-6. A torsion spring baffle IV-2-10 is fixed to a triangular support frame IV-2-9 through a torsion spring baffle bolt IV-2-7, a torsion spring adjusting plate IV-2-13 is connected with the torsion spring baffle IV-2-10 through a hinge IV-2-12, and the torsion spring adjusting plate IV-2-13 is fixed to the longitudinal adjusting plate IV-2-5 through a torsion spring adjusting plate bolt IV-2-14. Since the torsion spring adjusting plate is fixed, when the torsion springs work, the position of the torsion spring baffle will be adjusted. A shaft end of a torsion spring support shaft IV-2-15 is matched with a nut to be fixed to the longitudinal adjusting plate IV-2-5, the torsion spring support shaft IV-2-15 is provided with torsion springs IV-2-11, the torsion springs are separated by a sleeve IV-2-8, and a suitable number of the torsion springs may be mounted according to the actual situation.

Example 2

A slurry applying and scraping device used in an SG abrasive production process includes a syringe applying mechanism I and a slurry scraping mechanism II. The syringe applying mechanism I and the slurry scraping mechanism II are arranged above a belt mold III, and there may be a plurality of syringe applying mechanisms I arranged.

In this example, the scraping mechanism is the first scraping mechanism in FIG. 22 or the second scraping mechanism in FIG. 31.

Figure 3:
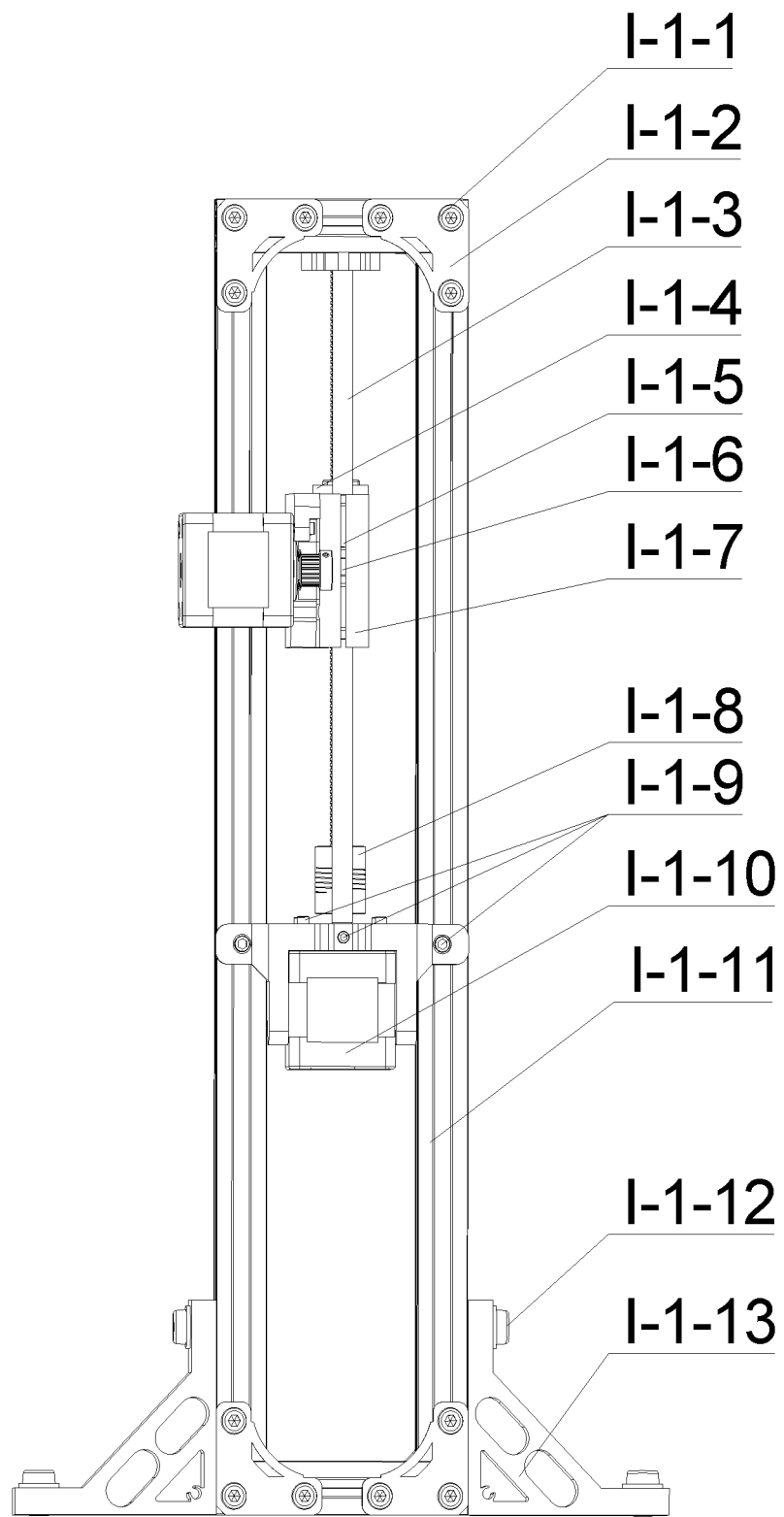
FIG. 3 is a front view of a syringe left support frame in Example 2 of the present invention.
Figure 5:
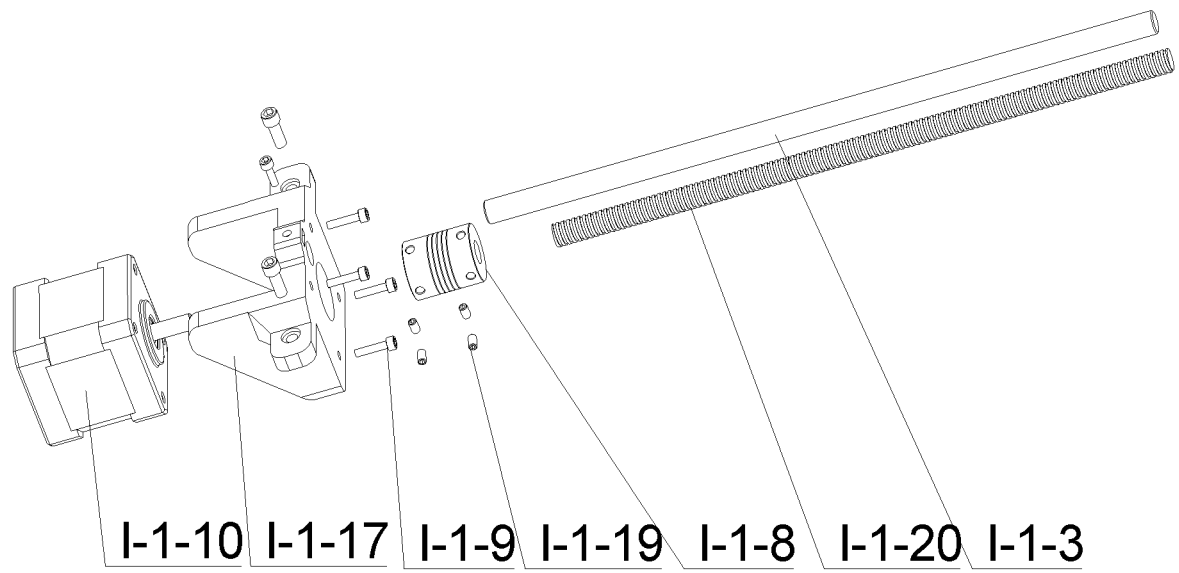
FIG. 5 is an exploded view of a syringe lifting component in Example 2 of the present invention.
Figure 6:
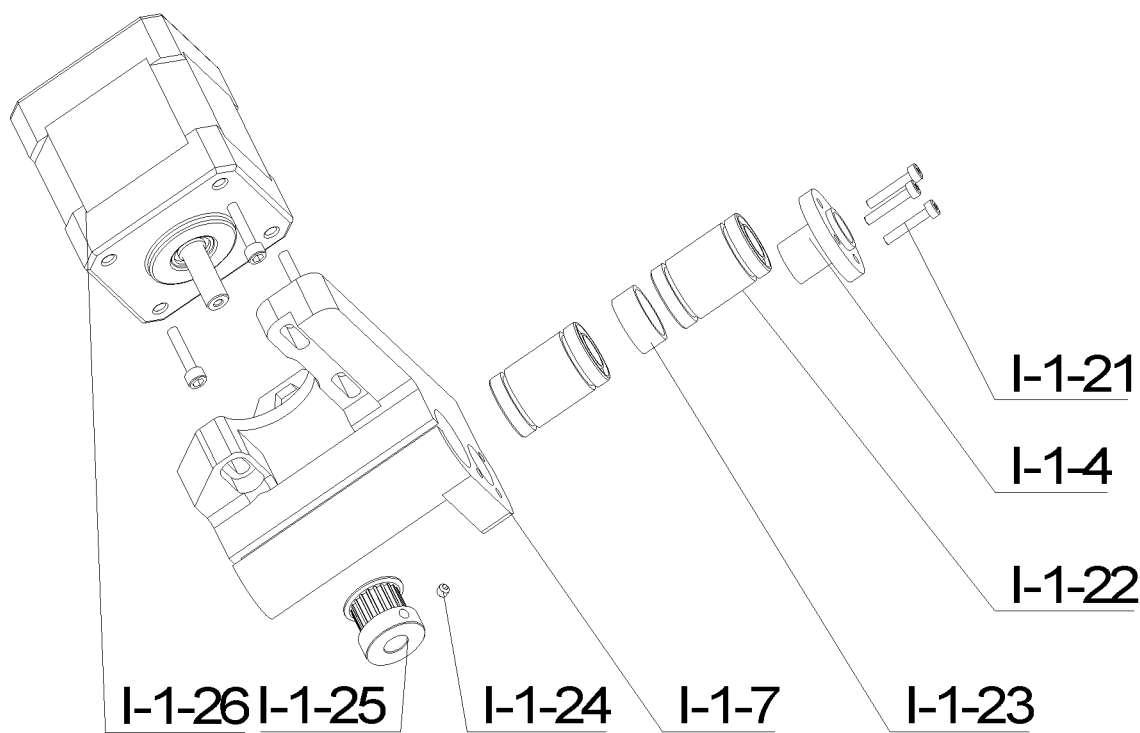
FIG. 6 is an exploded view of a timing belt control component in Example 2 of the present invention.
Figure 7:
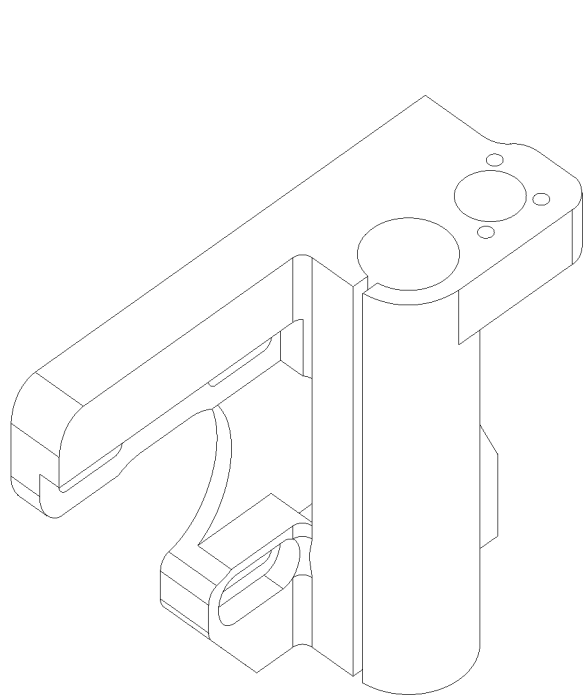
FIG. 7 is an axonometric view of an electric motor 2 fixing block in Example 2 of the present invention.
Figure 8:
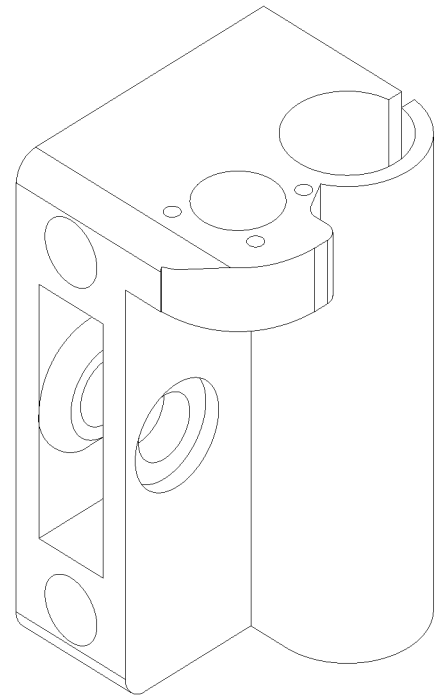
FIG. 8 is an axonometric view of a timing belt positioning block in Example 2 of the present invention.
Figure 10:
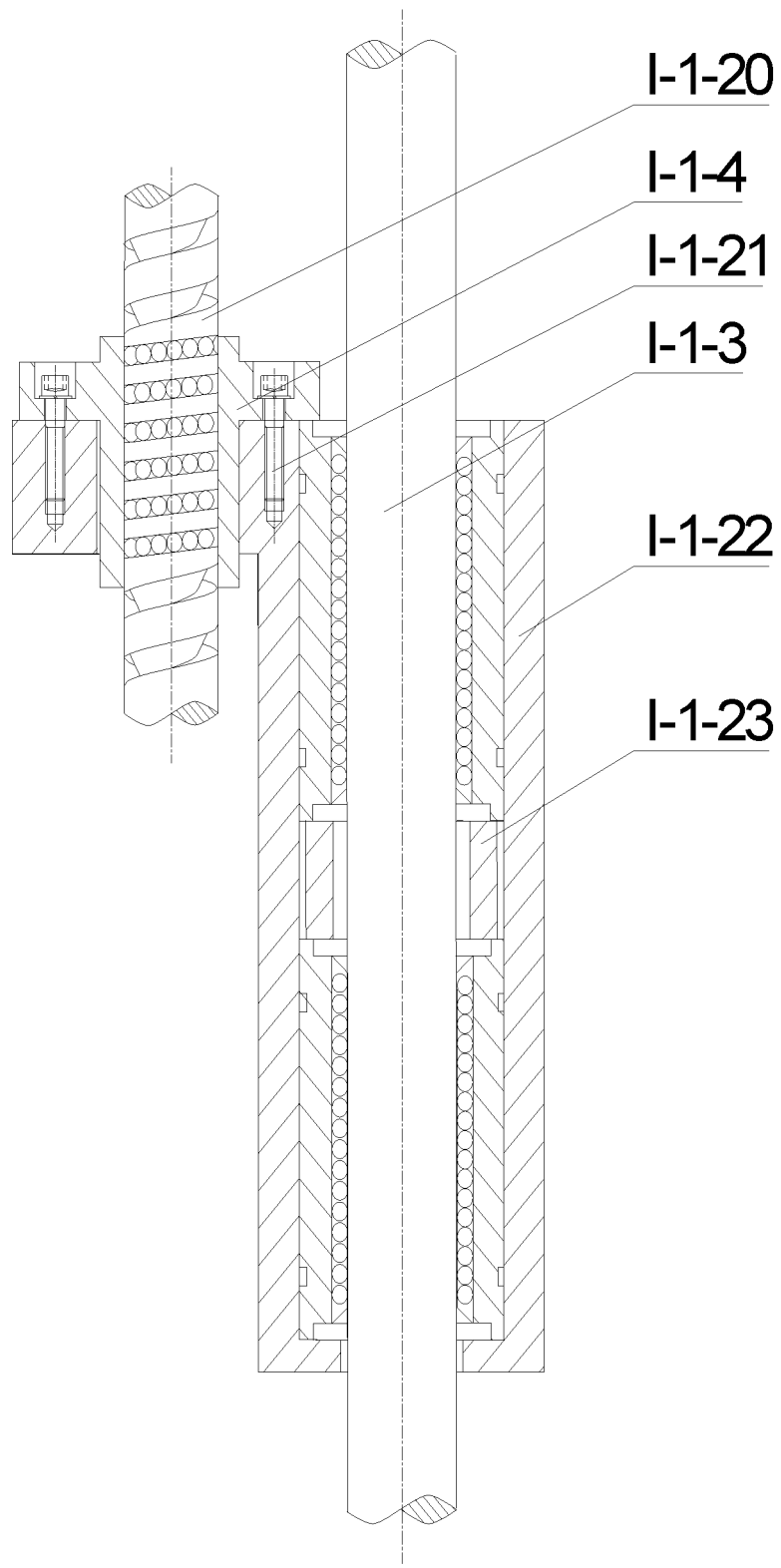
FIG. 10 is a sectional view showing a connection between a lead screw and a guide rail in Example 2 of the present invention.

As shown in a front view of a syringe left support frame in FIG. 3, an exploded view of a syringe lifting component in FIG. 5, an exploded view of a timing belt control device in FIG. 6, an axonometric view of an electric motor 2 fixing block in FIG. 7 and a sectional view showing a connection between a lead screw and a guide rail in FIG. 10, the syringe applying mechanism I includes a syringe support frame I-1 and a syringe I-2, the syringe support frame is in the shape of an inverted U, there is a set distance between the syringe support frame and a scraping mechanism support frame, the syringe support frame I-1 includes two sets of support frame profiles I-1-11 arranged vertically and transverse support profiles I-1-31 connecting the support frame profiles I-1-11 on two sides, the support frame profiles I-1-11 on one side are connected through a syringe left support frame angle plate I-1-2, and a support frame angle support I-1-13 fixes the syringe applying mechanism to the machine frame. An electric motor 2 I-1-26 is connected with an electric motor 2 fixing block I-1-7 through screws, the electric motor 2 I-1-26 and a timing belt pulley I-1-25 are fixed through a second holding screw I-1-24, a linear bearing 1 I-1-5, a linear bearing 2 I-1-22 and a linear bearing 1 fixing ring I-1-6 are mounted in linear bearing holes of the electric motor 2 fixing block I-1-7, a lower end of the linear bearing is positioned by a bottom of the bearing hole and an upper end is positioned by a lead screw nut 1 I-1-4, and the lead screw nut 1 I-1-4 is fixed to the electric motor 2 fixing block I-1-7 through a lead screw nut fixing screw I-1-21 and is matched with a lead screw I-1-20, so that the rotation of the lead screw drives the lead screw nut 1 I-1-4 to move, and thus drive the electric motor 2 fixing block I-1-7 and parts connected to the fixing block to move. An electric motor 1 I-1-10 is fixed to an electric motor 1 positioning plate I-1-17 through an electric motor 1 fixing plate bolt I-1-9, the electric motor 1 positioning plate I-1-17 is connected and fixed to the support frame profiles I-1-11 through screws, the lead screw I-1-20 is connected with a shaft end of the electric motor 1 I-1-10 through a coupling 1 I-1-8, a guide rail 1 I-1-3 is fixed in a guide rail hole in the electric motor 1 positioning plate I-1-17, and the rotation of the electric motor 1 can drive the lead screw to rotate.

Controlling the distance between the syringe barrel plug and the belt mold as small as possible can protect the completeness of the slurry layer, which facilitates obtaining the abrasive with a complete shape. The specific structures of the electric motor 1 fixing block and the electric motor 2 fixing block are not limited in detail. The electric motor 1 positioning plate I-1-17 is provided with a vertical guide rail hole matched with the guide rail 1, the electric motor 2 fixing block I-1-7 is provided with a transverse guide rail hole matched with a guide rail 3, the timing belt positioning block is provided with a guide rail hole matched with the guide rail 1, and the transverse guide rail hole of the electric motor 2 fixing block and the guide rail hole of the timing belt positioning block are respectively provided with an opening slot at the side part, so that the guide rail hole can move along the corresponding guide rail. The electric motor 2 fixing block is provided with a timing belt pulley and a synchronous motor, the timing belt positioning block is provided with a timing belt positioning wheel, one end of the timing belt is connected with the timing belt pulley, and the other end is fixed by the timing belt pulley. Since the syringe support slider is provided with timing belt teeth inside and the timing belt runs through the syringe support slider, the rotation of an electric motor 3 can drive the support slider to move, thereby driving the syringe to move transversely. The electric motor 3 drives the syringe lead screw to rotate through the coupling, thereby driving the syringe lead screw nut to move up and down. Since the syringe piston is connected with the syringe lead screw nut through a screw rod, the syringe piston is thereby driven to move, and the slurry in the syringe barrel is squeezed out.

The syringe moves transversely to apply the abrasive slurry to the belt mold in a reciprocating form. m (two in FIG. 1) sets of syringe applying mechanisms may be mounted in front of the scraping device. When the syringe moves once, a width of the applied slurry layer is d and a thickness is h, a distance between the syringe applying mechanisms is an even multiple of d, and the syringe reciprocates n (n is an even number) times. The distance is an even multiple, thereby facilitating feeding from the side of a feed port of the syringe barrel. The slurry can be injected through the feed port of the barrel in time according to the amount of the slurry remaining inside the syringe barrel, and the slurry may be injected by equipment such as an injection pump or the like. A stepping distance of the belt mold may be previously set according to a total width of the continuous slurry in front of the scraping device, and the total width is determined by the number of sets of syringes mounted and the width of application before the next injection of a single set of syringes.

Figure 4:
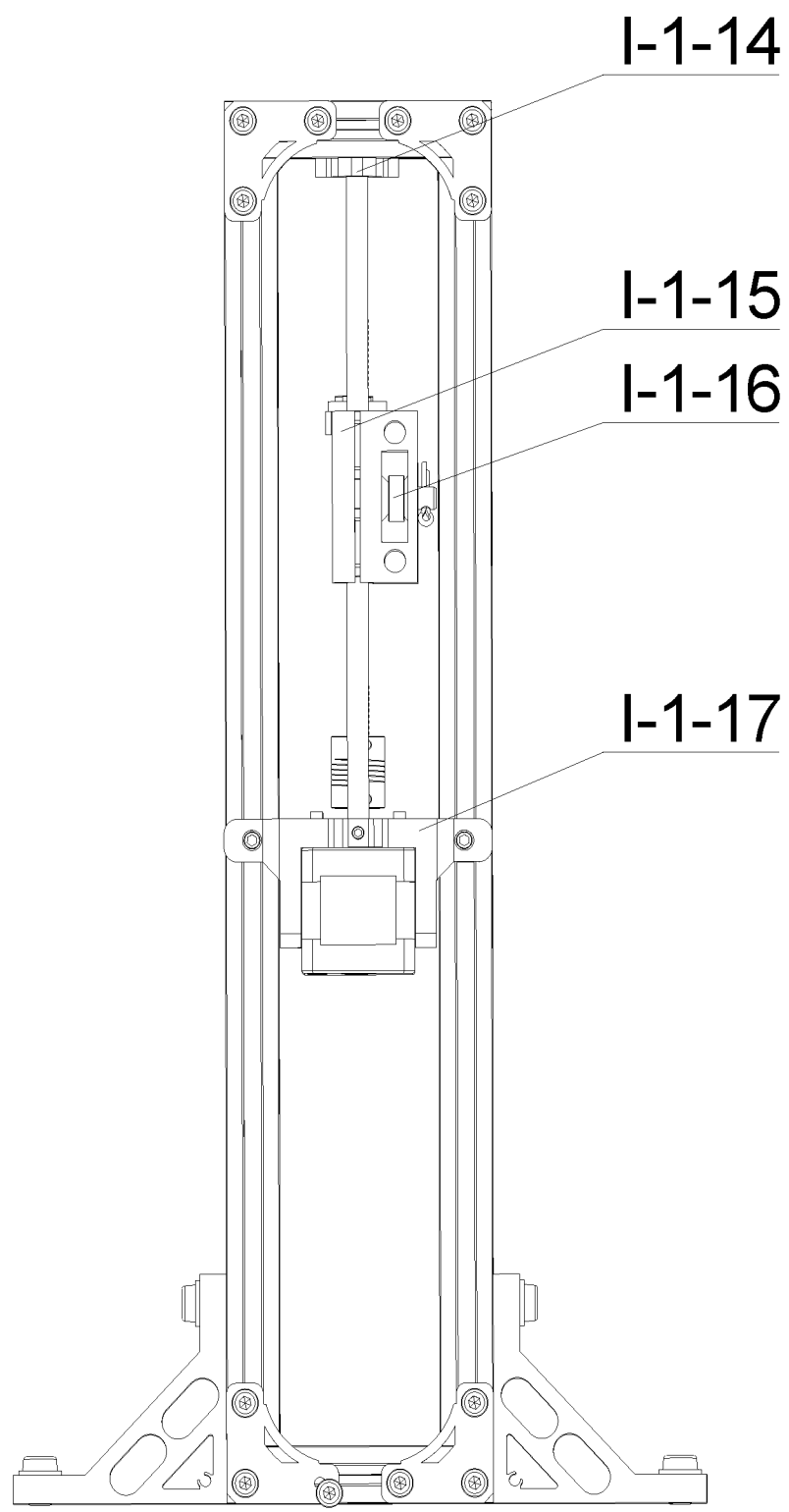
FIG. 4 is a front view of a syringe right support frame in Example 2 of the present invention.
Figure 9:
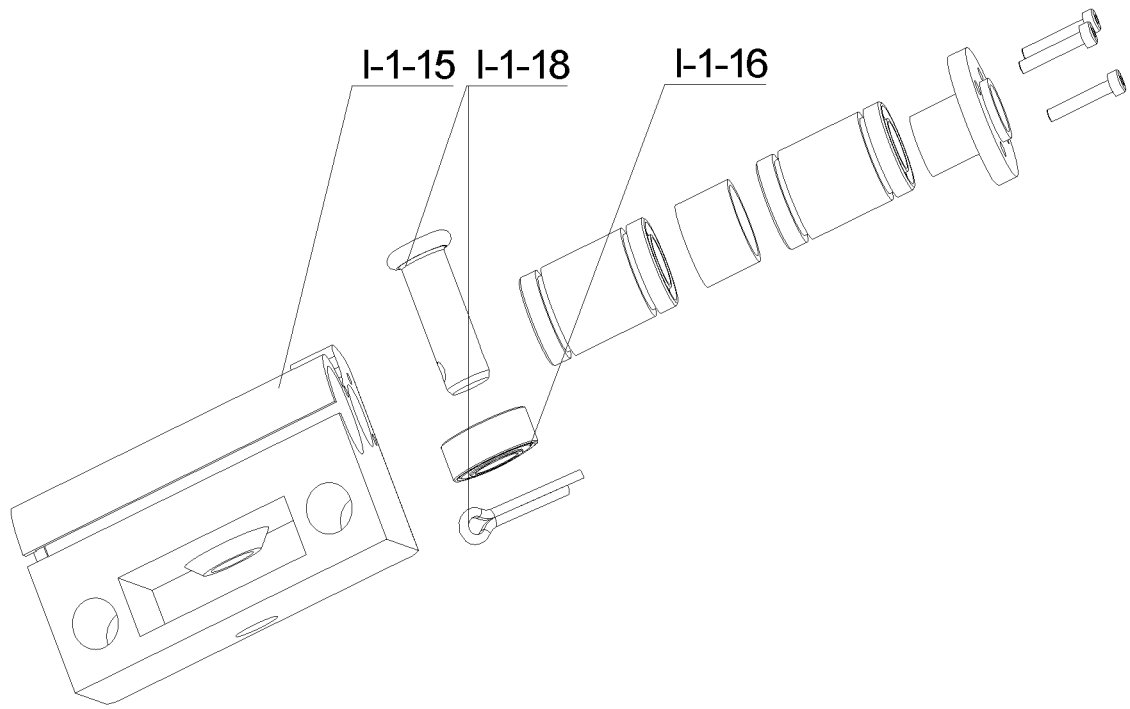
FIG. 9 is an exploded view of a timing belt positioning component in Example 2 of the present invention.

As shown in a front view of a syringe right support frame in FIG. 4 and an exploded view of a timing belt positioning device in FIG. 9, the timing belt positioning block I-1-15 is provided with linear bearings and a lead screw nut that are the same as those in the electric motor 2 fixing block I-1-7, and a timing belt positioning wheel I-1-16 is fixed to the timing belt positioning block I-1-15 through an axis pin I-1-18 and a cotter pin. One end of the timing belt is driven by the timing belt pulley, and the other end is fixed by the timing belt positioning block.

Figure 11:
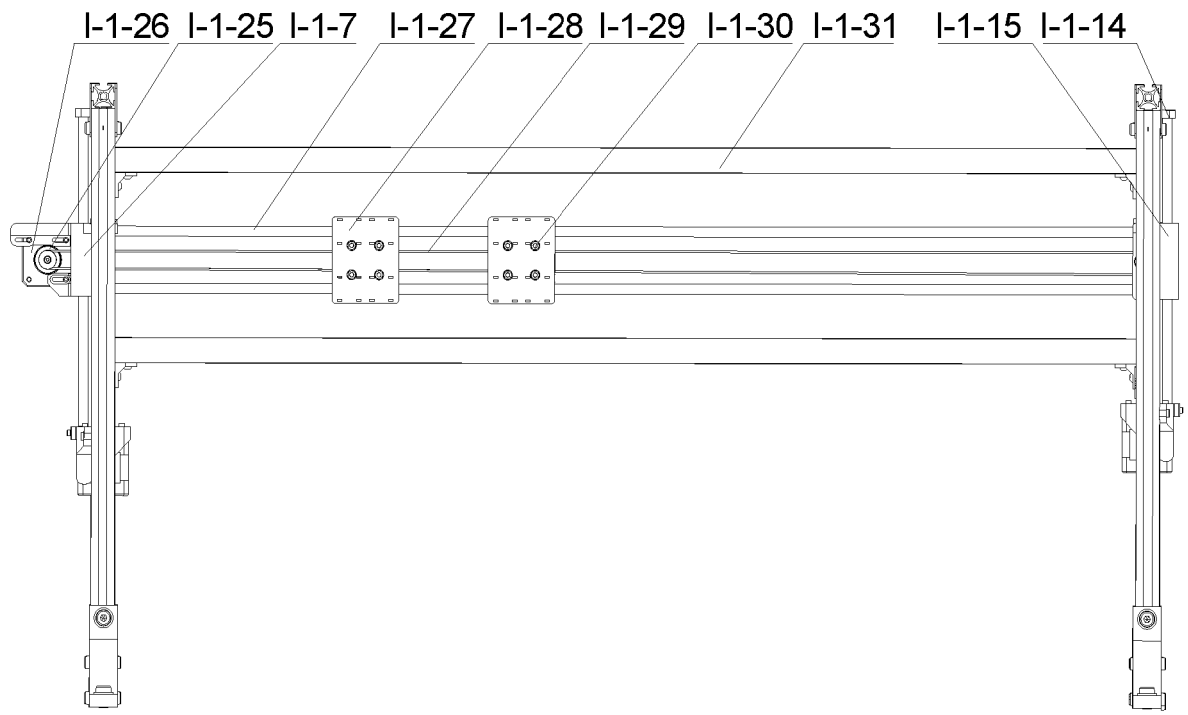
FIG. 11 is a front view of a syringe support frame in Example 2 of the present invention.
Figure 12:
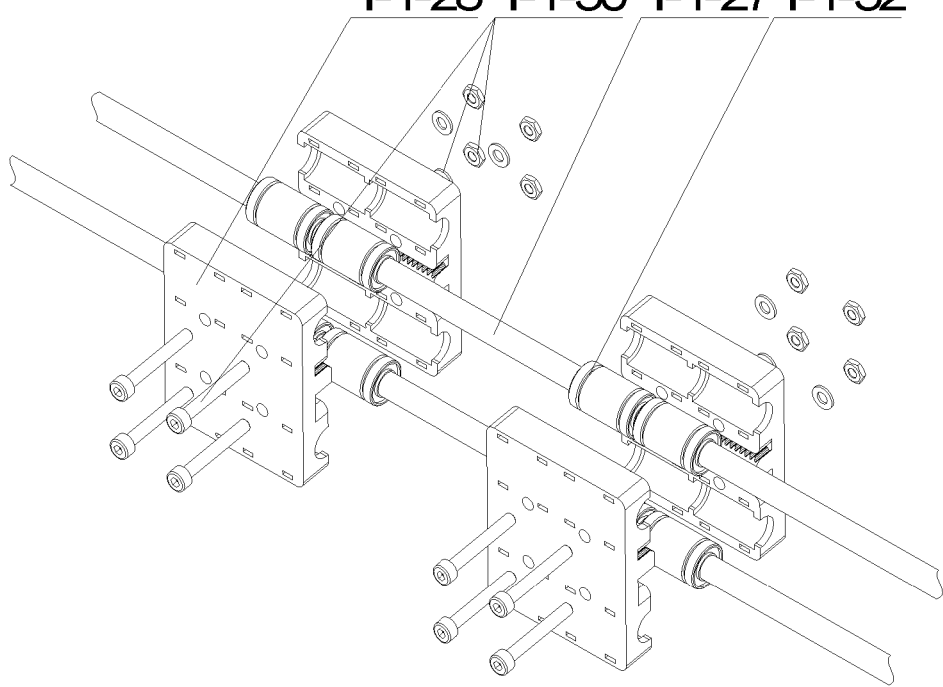
FIG. 12 is an exploded view of a syringe support slider and a transverse guide rail in Example 2 of the present invention.
Figure 13A:
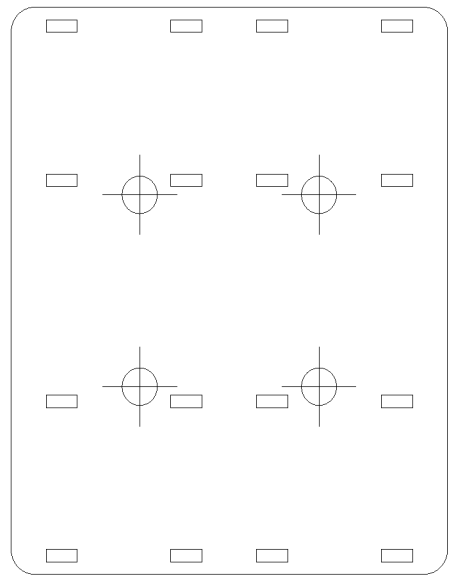
FIG. 13(*a*) is a front view of the syringe support slider in Example 2 of the present invention.
Figure 13B:
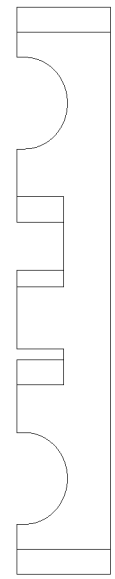
Figure 13C:
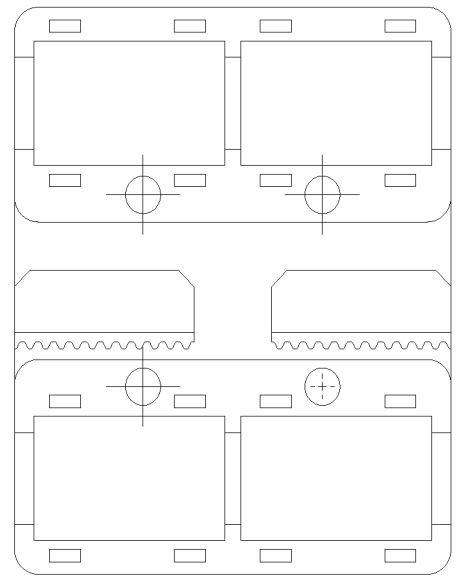

As shown in a front view of a syringe support frame in FIG. 11, an exploded view of a syringe support slider and a transverse guide rail in FIG. 12, and a front view, a side view and an inner side schematic diagram of the syringe support slider in FIG. 13(a) to FIG. 13(c), the syringe is fixed to the syringe support slider I-1-28, the two syringe support sliders I-1-28 are connected with a guide rail 3 I-1-27 through syringe support slider bolts I-1-30, a syringe lower frame I-2-12 is provided with bolt holes, and the syringe support slider bolts may connect the syringe lower frame I-2-12 and the syringe support sliders I-1-28. A linear bearing 3 I-1-32 is mounted between the two syringe support sliders, two shaft ends of the guide rail 3 I-1-27 are respectively fixed in the guide rail holes of the timing belt positioning block I-1-15 and the electric motor 2 fixing block I-1-7, and the syringe support sliders may slide along the direction of the guide rail 3. The syringe support slider I-1-28 is provided with timing belt engaging teeth therein that can be matched with the timing belt I-1-29, so that the rotation of the timing belt can drive the syringe support sliders to move.

It should be noted that the syringe support slider includes two butted halves, and the inner side of the two halves is provided with a groove for accommodating the guide rail 3.

Figure 14:
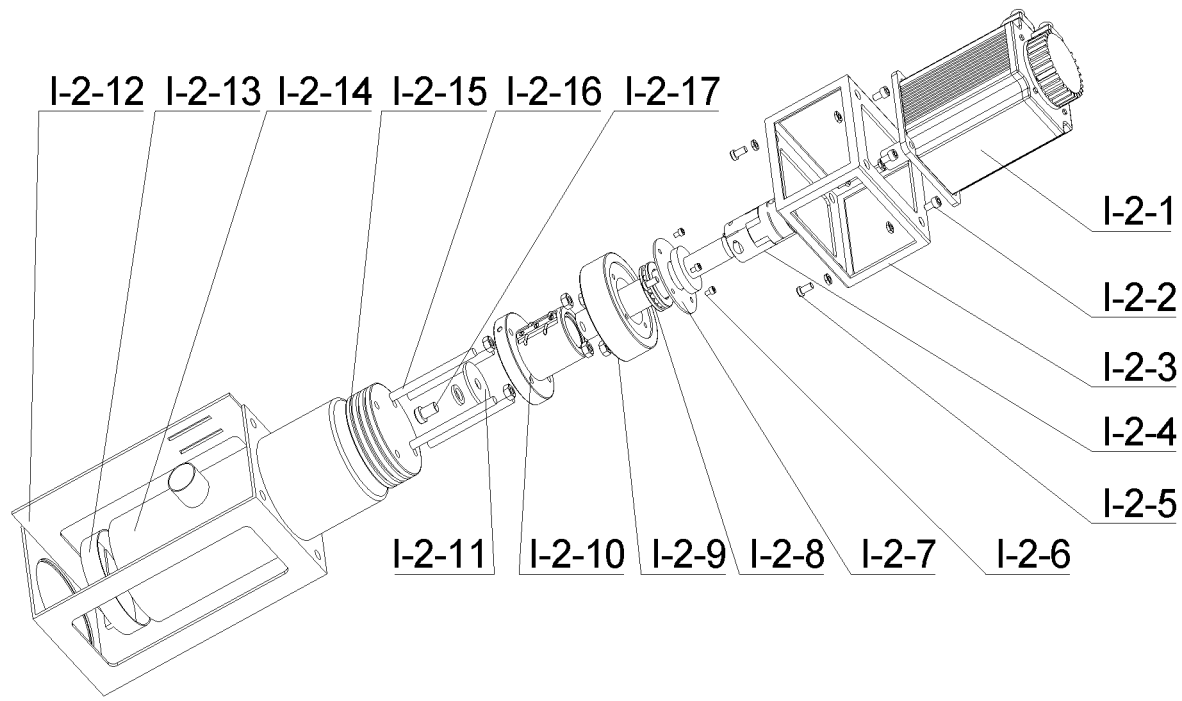
FIG. 14 is an exploded view of a syringe in Example 2 of the present invention.
Figure 15:
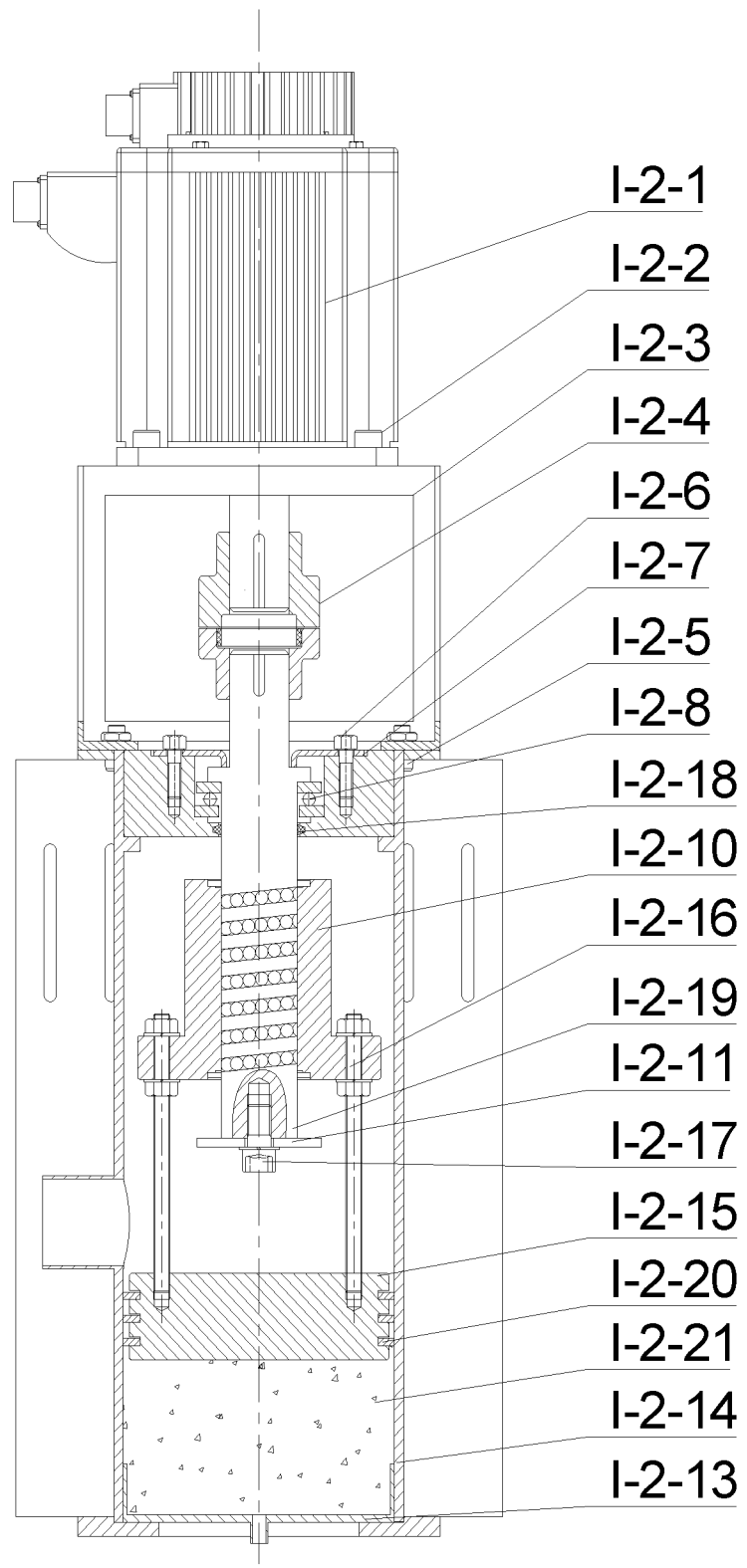
FIG. 15 is a full sectional view of the syringe in Example 2 of the present invention.
Figure 16A:
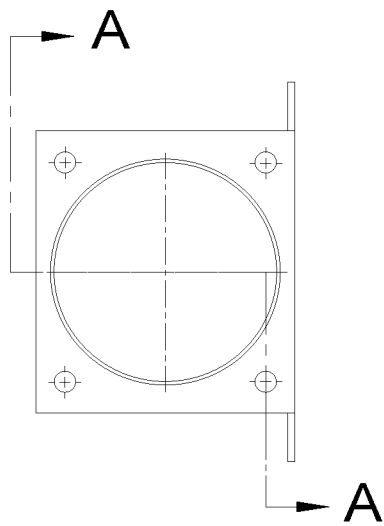
FIG. 16(*a*) is a side view of a syringe lower frame in Example 2 of the present invention.
Figure 16B:
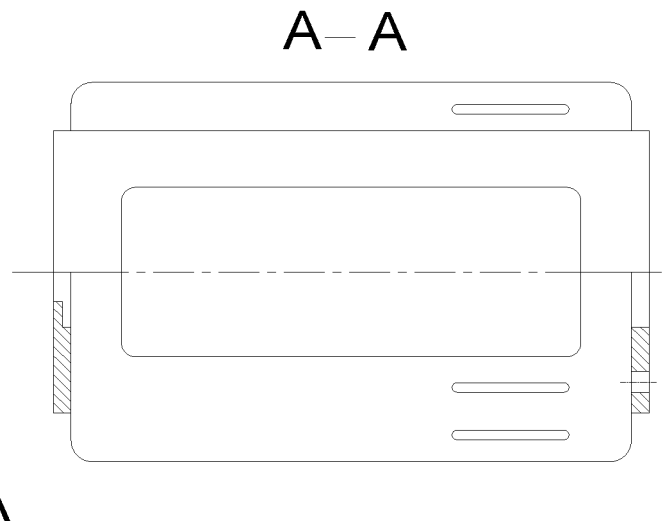
Figure 17:
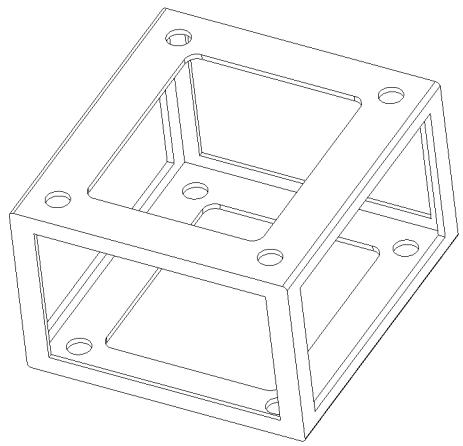
FIG. 17 is an axonometric view of a syringe upper frame in Example 2 of the present invention.
Figure 18:
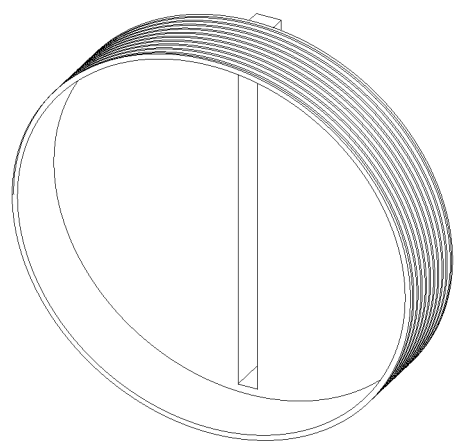
FIG. 18 is an axonometric view of a syringe barrel plug in Example 2 of the present invention.
Figure 19:
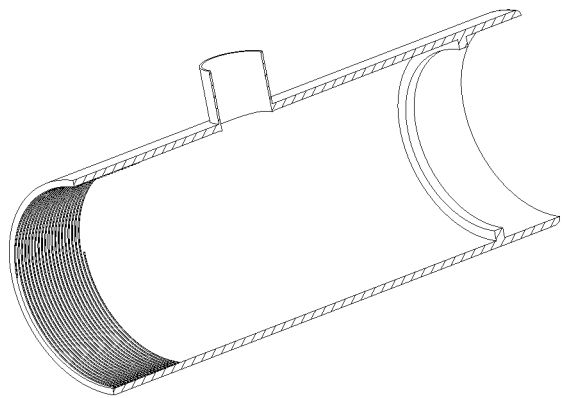
FIG. 19 is an axonometric view of a syringe barrel in Example 2 of the present invention.
Figure 20:
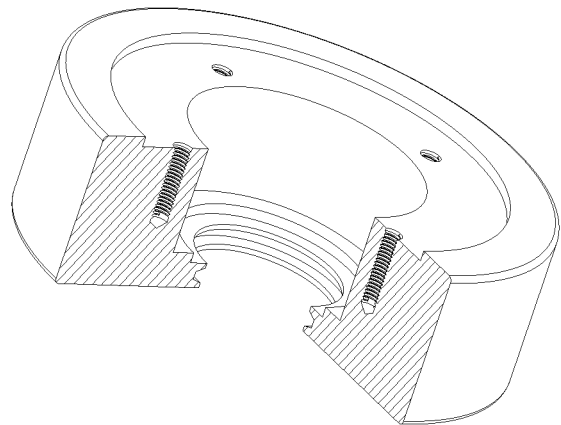
FIG. 20 is an axonometric view of a thrust bearing seat in Example 2 of the present invention.
Figure 21:
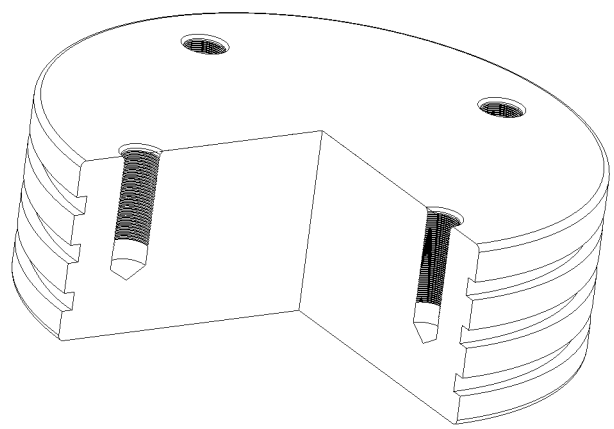
FIG. 21 is an axonometric view of a syringe piston in Example 2 of the present invention.

As shown in an exploded view of a syringe in FIG. 14, a full sectional view of the syringe in FIG. 15, a side view of a syringe lower frame in FIG. 16(*a*), a semi-sectional view of the syringe lower frame in FIG. 16(*b*), an axonometric view of a syringe upper frame in FIG. 17, an axonometric view of a syringe barrel plug in FIG. 18, an axonometric view of a syringe barrel in FIG. 19, an axonometric view of a thrust bearing seat in FIG. 20 and an axonometric view of a syringe piston in FIG. 21, the electric motor 3 I-2-1 is fixed to the syringe upper frame I-2-3 through an electric motor fixing bolt I-2-2, the syringe upper frame I-2-3 is connected with the syringe lower frame I-2-12 through an upper frame bolt I-2-5, a shaft end of the electric motor 3 I-2-1 is connected with a syringe lead screw I-2-19 through a coupling 2 I-2-4, a shaft shoulder of the syringe lead screw I-2-19 is fixed by a thrust bearing I-2-8, a lower end of the thrust bearing I-2-8 is positioned by a thrust bearing seat I-2-9 and an upper part is fixed by the upper frame bolt I-2-5, the upper frame bolt I-2-5 is fixed to the thrust bearing seat I-2-9 through a syringe lead screw upper part fixing ring bolt I-2-6, a lower end of the thrust bearing seat I-2-9 is positioned by a boss in the syringe barrel I-2-14, an upper end of the thrust bearing seat I-2-9 is fixed by the syringe upper frame I-2-3, the syringe lead screw I-2-19 is provided with a syringe lead screw nut I-2-10, a thrust bearing sealing ring I-2-18 is mounted in the thrust bearing seat I-2-9, the syringe lead screw nut I-2-10 is provided with four push rods I-2-16, a lower end of the push rod I-2-16 is fixed to a syringe piston I-2-15, the movement of the syringe lead screw nut drives the push rods and the syringe piston to move, a syringe lead screw nut lower retaining ring I-2-11 is fixed to a lower end of the syringe lead screw I-2-19 through a syringe lead screw nut lower retaining ring I-2-17, and a rubber ring I-2-20 is sleeved in a syringe piston ring groove. The rubber ring can ensure the sealability when the slurry is squeezed out, thereby preventing the slurry from going above the syringe piston. The syringe barrel plug I-2-13 and the syringe barrel I-2-14 are connected through threads, and a lower end of the syringe barrel plug I-2-13 is positioned by a boss at the bottom of the syringe lower frame I-2-12, so that when the syringe piston squeezes the slurry, the slurry will be squeezed out from a syringe barrel plug port and applied to the belt mold in the form of a layered slurry.

Figure 34:
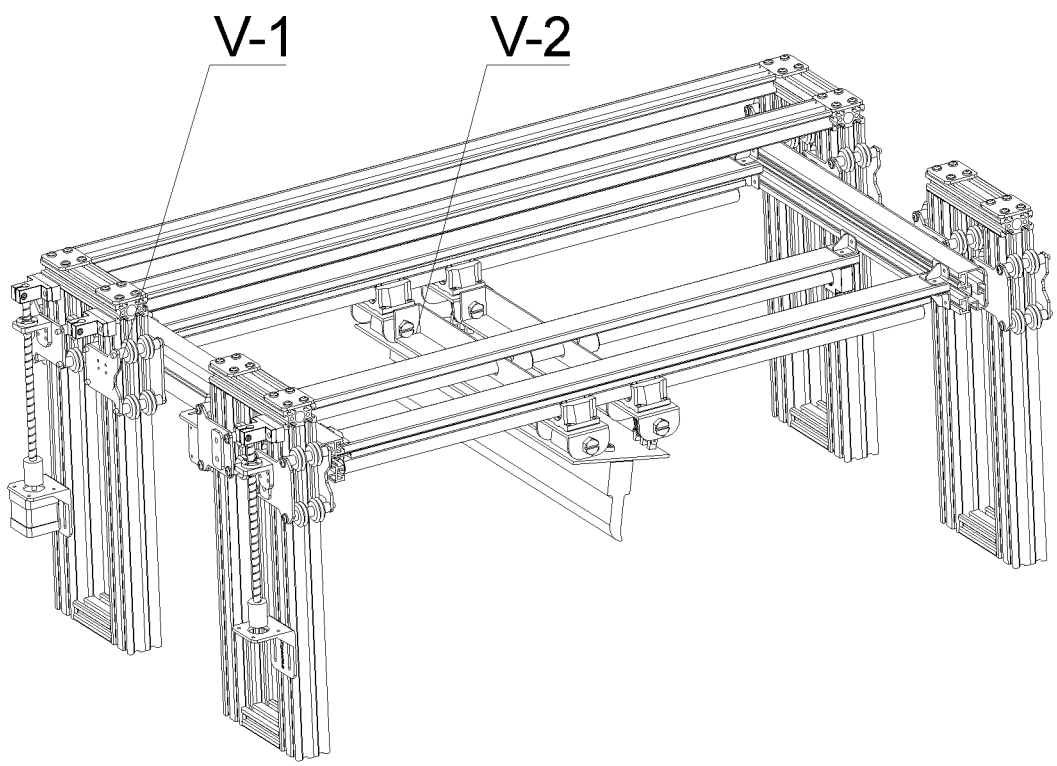
FIG. 34 is a general assembly diagram of a residual cleaning mechanism in Example 2 of the present invention.

As shown in a general assembly diagram of a residual cleaning mechanism in FIG. 34, the residual cleaning mechanism is composed of a cleaner support frame V-1 and a cleaner V-2, and the cleaner support frame V-1 is in the shape of an inverted U and is arranged at a rear side of the scraping mechanism.

Figure 35:
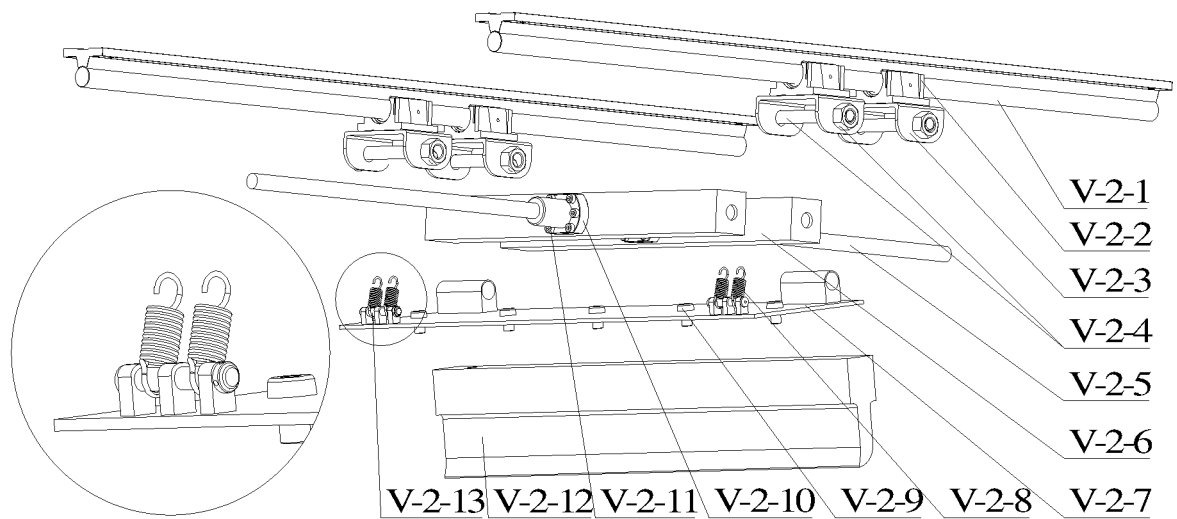
FIG. 35 is an exploded view of the residual cleaning mechanism in Example 2 of the present invention.
Figure 36:
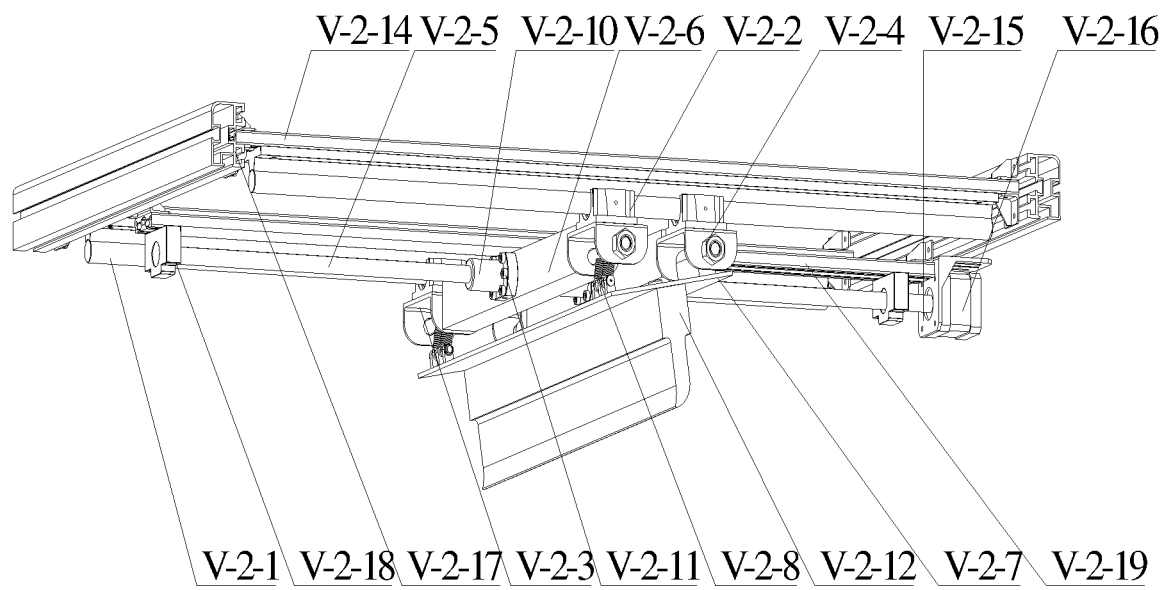
FIG. 36 is an axonometric view of the residual cleaning mechanism in Example 2 of the present invention.

As shown in an exploded view of the residual cleaning mechanism in FIG. 35 and an axonometric view of the residual cleaning mechanism in FIG. 36, a cleaner transverse lead screw fixing profile V-2-14 is connected with the profiles on two sides through an angle plate, a cleaner guide rail V-2-1 is fixed to the cleaner transverse lead screw fixing profile V-2-14 through bolts, and a hinge plate V-2-3 is connected with a cleaner slider V-2-2 through a bolt, so that the movement of the cleaner slider will drive the hinge plate to move. The hinge bolt V-2-4 connects the cleaner slider V-2-2 and a cleaner transverse lead screw nut fixing plate V-2-6, a hinge hole of a cleaning plate connecting plate V-2-7 is matched with a hinge bolt V-2-4 to form a rotary pair, one end of an extension spring V-2-8 is connected with the hinge bolt V-2-4 and the other end is connected with a spring hinge pin V-2-13, and a cleaning plate connecting plate bolt V-2-9 connects the cleaning plate connecting plate V-2-7 and a cleaning plate V-2-12, so that when the cleaning plate works, the length of the extension spring is adjusted according to the actual working situation so as to adjust the force acting on the surface of the belt mold by the cleaning plate in time. A cleaner transverse lead screw nut bolt V-2-11 fixes a cleaner transverse lead screw nut V-2-10 to the cleaner transverse lead screw nut fixing plate V-2-6, so that the movement of the screw nut drives the cleaner transverse lead screw nut fixing plate to move, thereby driving the cleaning plate to move. A cleaner transverse lead screw fixing profile 2 V-2-19 is fixed to a cleaner connecting profile V-2-17 through an angle plate, an electric motor 6 V-2-16 is fixed to the cleaner connecting profile V-2-17 through an electric motor 6 fixing plate V-2-15, and a cleaner transverse lead screw support seat V-2-18 is fixed to the cleaner transverse lead screw fixing profile 2 V-2-19 through bolts, so that the rotation of the electric motor 6 can drive the cleaner transverse lead screw to rotate.

Figure 37:
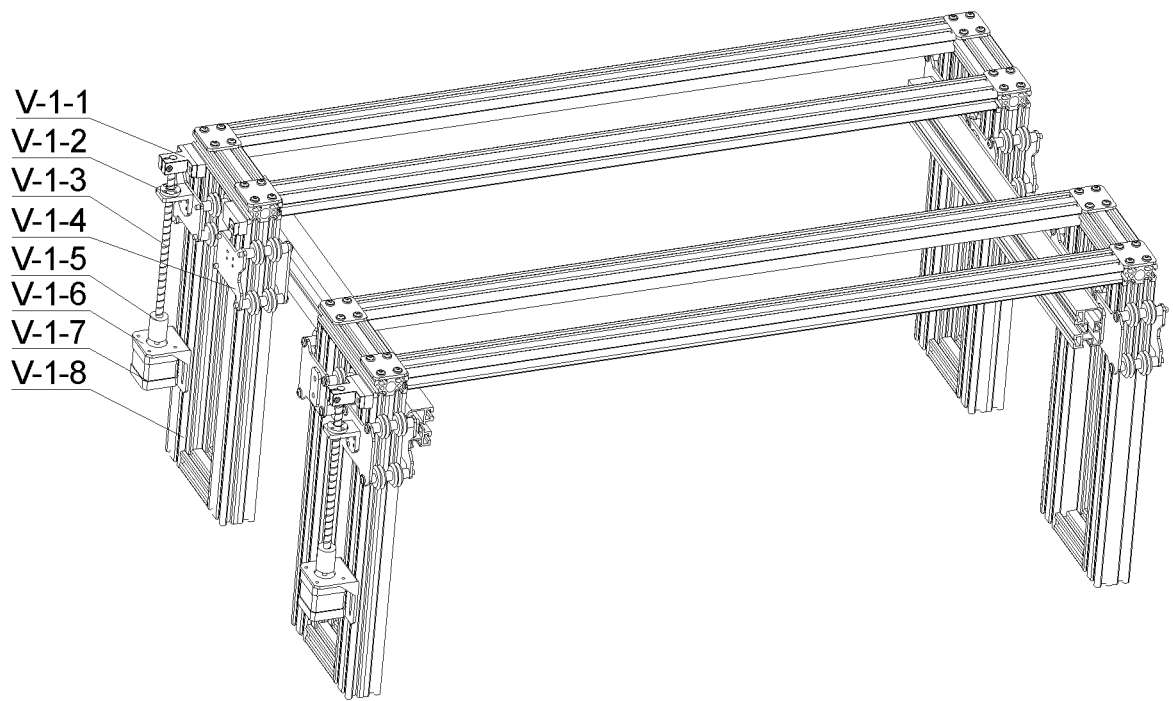
FIG. 37 is an axonometric view of a residual cleaning mechanism support frame in Example 2 of the present invention.

As shown in an axonometric view of a residual cleaning mechanism support frame in FIG. 37, a lead screw support seat 2 V-1-1 and an electric motor 4 fixing plate V-1-6 are fixed to a residual cleaning mechanism support profile V-1-8 through bolts. The electric motor 4 V-1-7 is connected with the electric motor 4 fixing plate V-1-6 through bolts, and its shaft end is connected with a lead screw 2 V-1-3 through a coupling 2 V-1-5. A lead screw nut fixing plate V-1-2 is connected with a cleaner lifting component V-1-4 through bolts, so that the movement of the lead screw nut drives the cleaner lifting component to move. The cleaner connecting profile V-2-17 is connected with the cleaner lifting component V-1-4 through screws, so that the movement of the lifting mechanism can drive the cleaner connecting profile to move, and thus drive the cleaner to move up and down. In the forward process, the lifting mechanism moves down, and in the backward process of the cleaner, the lifting mechanism moves up.

The foregoing descriptions are merely preferred embodiments of the present invention, but are not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. A slurry applying and scraping device used in a Sol-Gel (SG) abrasive production process, comprising:
    a syringe applying mechanism across a belt mold conveyor line, comprising a syringe for injecting a slurry to a belt mold; and
    a scraping mechanism comprising:
        a scraping master support;
        a scraper, wherein the scraper is connected with the scraping master support through a suspension component such that the scraper is suspended, and a damping spring is arranged in the suspension component; and
        a torsion spring adjusting component, wherein the torsion spring adjusting component comprises a plurality of torsion springs supported by a torsion spring support shaft, the torsion spring support shaft is fixed to the scraping master support, the torsion spring support shaft is movable up and down relative to the scraping master support, the torsion springs are clamped in a V-shaped plate, an end side of the V-shaped plate is connected with the scraping master support, and a side surface of the V-shaped plate is connected with the scraper, wherein the scraping mechanism is arranged on one side of the syringe applying mechanism, and the scraping mechanism is also arranged along the belt mold conveyor line.

2. The slurry applying and scraping device used in the SG abrasive production process according to claim 1, further comprising a residual cleaning mechanism, wherein the scraping mechanism is arranged between the syringe applying mechanism and the residual cleaning mechanism, the residual cleaning mechanism comprises a cleaner support frame across the belt mold conveyor line, and the cleaner support frame supports a cleaner.

3. The slurry applying and scraping device used in the SG abrasive production process according to claim 2, wherein the cleaner comprises a cleaning plate of which a bottom is capable of contacting the belt mold, the cleaning plate is connected with a cleaning moving component through extension springs, the cleaning moving component is connected with a cleaning lifting component supported by the cleaner support frame, the cleaning moving component drives the cleaning plate to move along a width direction of the belt mold, and the cleaning lifting component drives the cleaning plate to move up and down.

4. The slurry applying and scraping device used in the SG abrasive production process according to claim 1, wherein the syringe applying mechanism comprises a syringe support frame, the syringe support frame supports a guide rail, the syringe is mounted on the guide rail, the guide rail is connected with a syringe lifting component, and the guide rail is connected with a syringe horizontal moving component; and the syringe comprises a syringe barrel connected with the guide rail, a side part of the syringe barrel is provided with a slurry inlet, a bottom side of the syringe barrel is provided with a slurry outlet, a syringe piston is arranged in the syringe barrel, and the syringe piston is connected with a linear pushing component.

5. The slurry applying and scraping device used in the SG abrasive production process according to claim 1, wherein the scraping mechanism is replaceable with a first scraping mechanism comprising a scraping master support and a scraper, the scraper is connected with the scraping master support through a suspension component such that the scraper is suspended, and a damping spring is arranged in the suspension component.

\* \* \* \* \*